US010485374B2

United States Patent
Lo Faro et al.

(10) Patent No.: US 10,485,374 B2
(45) Date of Patent: Nov. 26, 2019

(54) CAPSULE BASED SYSTEM FOR PREPARING AND DISPENSING A BEVERAGE

(71) Applicants: Gian Matteo Lo Faro, Key West, FL (US); John R. Laverack, Southbury, CT (US); Yuanli Shentu, Waterbury, CT (US); Kurt R. Weseman, Middletown, CT (US); George E. Riehm, New Fairfield, CT (US); Greg G. Weaver, Waterbury, CT (US)

(72) Inventors: Gian Matteo Lo Faro, Key West, FL (US); John R. Laverack, Southbury, CT (US); Yuanli Shentu, Waterbury, CT (US); Kurt R. Weseman, Middletown, CT (US); George E. Riehm, New Fairfield, CT (US); Greg G. Weaver, Waterbury, CT (US)

(73) Assignee: La Vit Technology LLC, New York, NY (US)

( * ) Notice: Subject to any disclaimer, the term of this patent is extended or adjusted under 35 U.S.C. 154(b) by 131 days.

(21) Appl. No.: 15/784,507

(22) Filed: Oct. 16, 2017

(65) Prior Publication Data

US 2018/0289204 A1 Oct. 11, 2018

Related U.S. Application Data

(60) Continuation of application No. 14/323,713, filed on Jul. 3, 2014, now Pat. No. 9,808,113, which is a (Continued)

(51) Int. Cl.
*A47J 31/40* (2006.01)
*B65D 85/804* (2006.01)
(Continued)

(52) U.S. Cl.
CPC ............ *A47J 31/407* (2013.01); *A23F 3/18* (2013.01); *A23F 5/262* (2013.01); *A23L 2/39* (2013.01);
(Continued)

(58) Field of Classification Search
CPC . A47J 31/407; A47J 31/4492; B65D 85/8043; B65D 85/8046; B65D 79/00;
(Continued)

(56) References Cited

U.S. PATENT DOCUMENTS

| 3,101,870 A | 8/1963 | Betner ................. 222/153.07 |
| 3,295,998 A | 1/1967 | Goros ......................... 99/282 |

(Continued)

FOREIGN PATENT DOCUMENTS

| DE | 3446093 A1 | 6/1986 |
| DE | 29618751 U1 | 2/1997 |

(Continued)

OTHER PUBLICATIONS

PCT Search Report and opinion for PCT/US15/036501 dated Sep. 25, 2015.

(Continued)

*Primary Examiner* — Nicolas A Arnett
(74) *Attorney, Agent, or Firm* — Clifford H. Kraft

(57) ABSTRACT

The present invention relates to dispensing of a substance from a container by means of a dispensing apparatus. Specifically, the exemplary embodiment of the present invention relates to (1) a container and (2) the automated method for opening such container and (3) the automated method of dispensing of the contents from such container into a customer receptacle or glass.

12 Claims, 26 Drawing Sheets

Related U.S. Application Data division of application No. 13/293,043, filed on Nov. 9, 2011, now abandoned.

(60) Provisional application No. 61/411,786, filed on Nov. 9, 2010.

(51) Int. Cl.
    *A47J 31/44*     (2006.01)
    *A23F 3/18*     (2006.01)
    *A23F 5/26*     (2006.01)
    *A23L 2/39*     (2006.01)
    *B65D 79/00*     (2006.01)
    *G06K 7/14*     (2006.01)

(52) U.S. Cl.
CPC .......... *A47J 31/4492* (2013.01); *B65D 79/00* (2013.01); *B65D 85/8043* (2013.01); *B65D 85/8046* (2013.01); *G06K 7/1417* (2013.01); *A23V 2002/00* (2013.01)

(58) Field of Classification Search
CPC ... A23F 3/18; A23F 5/262; A23L 2/39; A23V 2002/00; G06K 7/1417
See application file for complete search history.

(56) References Cited

U.S. PATENT DOCUMENTS

| | | | |
|---|---|---|---|
| 3,743,520 A | 7/1973 | Croner | 426/87 |
| 4,091,930 A | 5/1978 | Buchner et al. | 229/200 |
| 4,437,499 A | 3/1984 | Davale | |
| 4,492,295 A | 1/1985 | DeWoolfson | |
| 4,863,036 A | 9/1989 | Heijenga | 229/123.1 |
| 5,156,329 A | 10/1992 | Farrell | 229/125.35 |
| 5,316,603 A | 5/1994 | Akazawa et al. | 156/69 |
| 5,393,032 A | 2/1995 | Cederroth | |
| 5,433,374 A | 7/1995 | Forbes, Jr. | 229/125.35 |
| 5,613,617 A | 3/1997 | Da Vitoria Lobo | 220/359.2 |
| 5,906,845 A | 5/1999 | Robertson | |
| 6,085,942 A | 7/2000 | Redmond | 222/107 |
| 6,145,705 A | 11/2000 | Wallace et al. | |
| 6,886,690 B2 | 5/2005 | Petricca | 206/356 |
| 6,945,157 B2 | 9/2005 | Brown et al. | |
| 7,032,507 B2 | 4/2006 | Cai | |
| 8,418,603 B2 | 4/2013 | Mahlich | A47J 31/407 |
| | | | 99/323.1 |
| 8,431,175 B2 | 4/2013 | Yoakim | A47J 31/22 |
| | | | 426/431 |
| 8,770,094 B2 | 7/2014 | Rithener | A47J 31/402 |
| | | | 141/100 |
| 8,920,858 B2 * | 12/2014 | Yauk | A23L 2/40 |
| | | | 426/115 |
| 8,978,542 B2 | 3/2015 | Talon | A47J 31/005 |
| | | | 99/279 |
| 9,095,236 B2 | 8/2015 | Perentes | A47J 31/3695 |
| 9,271,598 B2 | 3/2016 | Yoakim | A47J 31/22 |
| 9,277,837 B2 | 3/2016 | Yoakim | A47J 31/22 |
| 9,320,382 B2 | 4/2016 | Lo Faro | A47J 31/407 |
| 9,326,636 B2 | 5/2016 | Giannelli | A47J 31/407 |
| 9,434,532 B2 | 9/2016 | Yoakim | A47J 31/22 |
| 9,486,102 B2 | 11/2016 | Baldo | A47J 31/3633 |
| 9,526,371 B2 * | 12/2016 | Lo Faro | A47J 31/407 |
| 9,808,113 B2 * | 11/2017 | Lo Faro | A47J 31/407 |
| 10,118,757 B2 * | 11/2018 | Lo Faro | A47J 31/401 |
| 2007/0131687 A1 | 6/2007 | Otto et al. | 220/212 |
| 2007/0164045 A1 | 7/2007 | Wydler et al. | 222/106 |
| 2007/0175334 A1 | 8/2007 | Halliday et al. | |
| 2008/0148948 A1 | 6/2008 | Evers et al. | 99/275 |
| 2008/0190937 A1 | 8/2008 | Cho | 220/573.1 |
| 2008/0223741 A1 | 9/2008 | Nyambi et al. | |
| 2009/0155422 A1 | 6/2009 | Ozanne | A47J 31/0615 |
| | | | 426/89 |
| 2009/0194105 A1 | 8/2009 | Besseler et al. | |
| 2009/0241782 A1 | 10/2009 | Van Dillen et al. | 99/279 |
| 2010/0154644 A1 | 6/2010 | Skalski | A47J 31/0668 |
| | | | 99/275 |
| 2010/0154649 A1 | 6/2010 | Skalski et al. | |
| 2010/0162898 A1 | 7/2010 | Mahlich | A47J 31/401 |
| | | | 99/290 |
| 2010/0162901 A1 | 7/2010 | Mahlich | A47J 31/407 |
| | | | 99/323.1 |
| 2010/0173056 A1 | 7/2010 | Yoakim | A47J 31/22 |
| | | | 426/433 |
| 2010/0180775 A1 | 7/2010 | kollep et al. | |
| 2010/0186599 A1 | 7/2010 | Yoakim | A47J 31/22 |
| | | | 99/295 |
| 2012/0231126 A1 * | 9/2012 | Lo Faro | A47J 31/407 |
| | | | 426/115 |
| 2012/0298258 A1 | 11/2012 | Rithener | A47J 31/402 |
| | | | 141/285 |
| 2013/0071532 A1 | 3/2013 | Pribus | A47J 31/46 |
| | | | 426/431 |
| 2013/0189400 A1 | 7/2013 | Pribus | B65D 85/8043 |
| | | | 426/115 |
| 2013/0236609 A1 | 9/2013 | Magniet | A47J 31/369 |
| | | | 426/87 |
| 2013/0239820 A1 | 9/2013 | Baldo | A47J 31/3633 |
| | | | 99/295 |
| 2013/0312619 A1 | 11/2013 | Spiegel | A47J 31/3623 |
| | | | 99/295 |
| 2014/0141141 A1 | 5/2014 | Giannelli | A47J 31/407 |
| | | | 426/431 |
| 2014/0352547 A1 | 12/2014 | Leuzinger | A47J 31/3676 |
| | | | 99/295 |
| 2014/0360377 A1 | 12/2014 | Yoakim | A47J 31/22 |
| | | | 99/295 |
| 2015/0017288 A1 | 1/2015 | Lo Faro | A47J 31/407 |
| | | | 426/112 |
| 2015/0040768 A1 | 2/2015 | Leuzinger | A47J 31/3676 |
| | | | 99/285 |
| 2015/0079240 A1 | 3/2015 | Lo Faro | A47J 31/401 |
| | | | 426/115 |
| 2015/0135965 A1 | 5/2015 | Lo Faro | A47J 31/407 |
| | | | 99/285 |
| 2015/0144001 A1 * | 5/2015 | Lo Faro | A47J 31/407 |
| | | | 99/283 |
| 2015/0147448 A1 | 5/2015 | Lo Faro | A47J 31/407 |
| | | | 426/383 |
| 2016/0255990 A1 | 9/2016 | Bartoli | A47J 31/0668 |
| 2017/0202247 A1 * | 7/2017 | Lo Faro | A47J 31/407 |
| 2017/0233178 A1 * | 8/2017 | Lo Faro | A47J 31/401 |
| | | | 99/295 |

FOREIGN PATENT DOCUMENTS

| | | |
|---|---|---|
| EP | 332885 A1 | 9/1989 |
| EP | 1844805 A1 | 10/2007 |
| GB | 2380990 A1 | 4/2003 |
| WO | WO-2005/079637 A1 | 9/2005 |
| WO | WO-2010/025392 A2 | 3/2010 |
| WO | WO2012/064885 A | 5/2012 |

OTHER PUBLICATIONS

Definition of adjacent and "edge" Websters New World Dictionary, Third College Edition, 1988 Simon & Schuster.
European Search Report corresponding to European Application No. 11840149.6, dated Aug. 23, 2013, 6 pages.
International Search Report and Written Opinion dated Mar. 27, 2012 for corresponding International Patent Application No. PCT/US2011/060050 (13 pages).

* cited by examiner

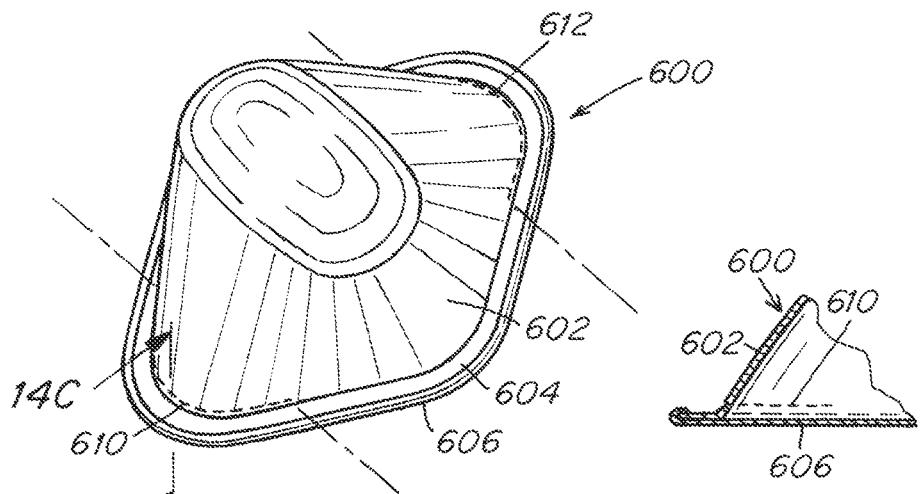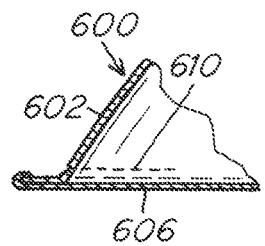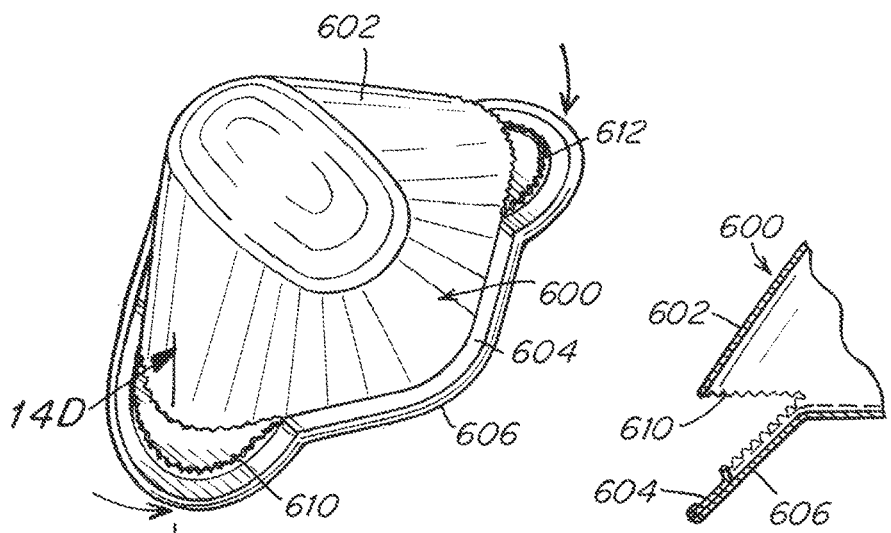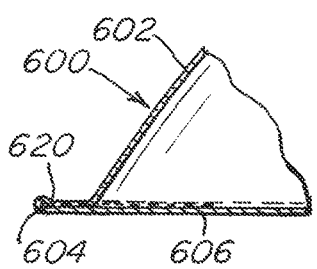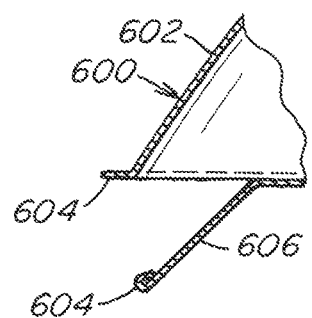
Fig. 14A  Fig. 14C  Fig. 14B  Fig. 14D  Fig. 14E  Fig. 14F

CAPSULE BASED SYSTEM FOR PREPARING AND DISPENSING A BEVERAGE

This is a continuation of application Ser. No. 14/323,713 filed Jul. 3, 2014 which was a divisional of application Ser. No. 13/293,043 filed Nov. 9, 2011 which claimed priority to application 61/411,786 filed Nov. 9, 2010. Application Ser. Nos. 14/323,713, 13/293,043 and 61/411,786 are hereby incorporated by reference in their entireties.

BACKGROUND OF THE INVENTION

Field of the Invention

This invention relates to systems for dispensing a beverage. The invention also relates to capsule used in a system for dispensing a beverage and methods of dispensing a beverage from a capsule.

Description of the Related Art

There are a number of devices and techniques for dispensing a beverage such as, for example, a cup of coffee or tea from a capsule. In one approach a disposable container fits on top of a cup and has a compartment for receiving a beverage extract such as coffee with a large reservoir on top into which a person must pour boiling water. These devices can be disposable but expensive, the coffee is exposed to the air where it can easily get stale or contaminated, and they are not generally suitable for automatic coffee making or other beverage machines. Because the flow rate of beverage is generally slow, these devices are typically large relative to the volume of beverage dispensed. Also these devices can be designed to be used upright and only the bottom area is available for filtration flow arid this contributes to the slowness of the filtration process. In one construction, a filter is provided in a sealed receptacle and a support member is included intermediate the receptacle arid filter which functions to support the filter. When the filter is wetted, it sags and conforms with the support member which has a hole in it to release the filtered beverage but otherwise blocks the output of the filter. Such a filter design used in an application where water is injected under pressure would provide low flow rates.

There are several known companies operating proprietary capsule based machines in the coffee and tea space, including Nestle's Nespresso, Green Mountain Coffee Roaster's Keurig, and Kraft's Tassimo. Mars Flavia and Britta Yource are machines utilizing a pouch-style single use dispensing system.

Currently, there are three other machines attempting to commercialize a similar capsule/pod based single-serve point of use beverage system. Omnifrio uses a puncture mechanism, which punctures the top and bottom of the capsule allowing a syrup concentrate to drain out. Bevyz uses a pressure mechanism to pop open the capsule to enable a mixing process. Finally, Esio makes a machine that offers a single serve beverage solution using a pouch system.

When cold drinks are dispensed in a system in which the beverage is prepared by mixing cold fluid, usually water with a powder, one significant challenge is that the powder will not dissolve effectively during the mixing process. This can lead to poor quality output from the beverage system and unsightly and possibly unhealthful residue in the machine itself. The present invention is intended to provide a system for providing a hot, cold ambient temperature mixed beverage designed to enable the effective mixture of the powder with the cold liquid during dispensing providing for little or no residue, contamination or cross contamination between beverages.

BRIEF SUMMARY OF THE INVENTION

The purpose of the invention is to offer a compelling alternative to bottled water and other water based ready-to-drink (RTD) beverages. The invention is meant to offer a convenient, reliable, and cost effective Point of Use solution to the consumer's hydration and beverage needs. The invention is a single-serve beverage system that can produce unlimited chilled filtered water as well as single serve unique beverages through a proprietary capsule-based system. The invention can be cold, hot, still (not sparkling), flavored, enhanced, ultra purified filtered waters and flavors.

The capsules contain a powder or a liquid which is mixed into the filtered water to produce the beverage. The drinks can be "house formulas" or common mass market branded beverages licensed from the manufacturers.

The varied embodiments of the invention have multiple benefits:

On-Demand Pure Water: Unlimited filtered, pure water. Potentially unhealthy contaminants are filtered out of water.

On-Demand Custom Beverages: Customers can enjoy many of their favorite branded beverages, produced with very pure water, chilled to the correct temperature. Option to make sparkling beverages available in certain machine models.

Reduction of $CO_2$: No need to transport heavy bottled beverage to point of consumption. Each machine in use lowers carbon emissions.

Space Savings: No need to stock voluminous beverages saves space in the fridge/kitchen/pantry.

Health Benefit: Improved hydration resulting from more convenient and better hydration options including better concentration, better circulation, and overall general better health.

Financial Benefit: Capsule cost approximately 2-3% of the cost of regular bottled water and approximately 33% of the cost of bottled beverages.

The peeling method of accessing the capsule offers an effective and efficient way to prepare and deliver a beverage. A mechanical device is adapted to peel off some or all of the top cover of a capsule. Alternatively, a drive motor to rotate it toward a cutter to cut or scrape the fop cover of the capsule. Alternatively, slight crease could be included in a lip of the capsule that can be used to break the seal and allow the cover to then be peeled back. When the cover is peeled back (tearing or scraping) the drink is mixed with a mixing stream Of liquid, which in many embodiments will be water, either cold or hot, sparkling or not. Testing has been successful in flushing a drink powder concentrate out of a capsule using a stream of water from an ordinary sink faucet as well as in controlled experiments in a fully functioning test rig.

In another embodiment, the invention includes capsule that includes one or more creases at the interface between the capsule cover and the capsule body. Forces may be applied to the capsule to open the capsule at the creases to access the beverage. The beverage may be mixed in the capsule using a mixing stream into the capsule, vibration to get the material in the capsule out of the capsule for mixing outside the capsule or a combination of both. In many embodiments a finishing stream is used to direct the mixing stream into the container that is filled with the mixed beverage.

It may be advantageous to promote a controlled tear in the crease of the capsule which can ensure a smooth opening of the capsule. The controlled tear can serve to lower the force required to open the capsule and/or provide a more uniform and repeatable tear to open the capsule. A raised leading edge on the mechanism used to open the capsule can serve to provide a controlled tear. The raised leading edge can be located such that it would facilitate opening the capsule along a longitudinal center line of the capsule or it may be off the centerline of the capsule so that the peal will be initiated off the centerline and travel along a crease to open the capsule.

Specific technical achievements of the invention may include:
Easy Recycling: The capsule is recyclable in the common aluminum recycling stream along with aluminum cans. No special treatment or collection is required for recycling. The capsules are free of residue or contaminants (such as coffee grinds).
Bacteria Control: All mixing occurs in the capsule, so there is no cross contamination between the possible sugary substances dispensed by the machine and the machine itself. The finished product leaves the capsule and goes directly into the customer glass.
Sterilization: The mixing chamber may be self sterilizing either by heat or UV light, depending on the machine make and model.
Finishing Stream for Excellent Mixing Characteristics: A finishing stream mixes any powder or liquid which may have made it into the beverage container (e.g. glass). This relatively powerful jet creates a vortex in the glass/receptacle thereby providing additional mixing. Optionally, certain machines may have a secondary washable mixing funnel where additional mixing may take place for certain beverage types.

BRIEF DESCRIPTION OF THE DRAWINGS

FIGS. 14A-14F illustrate details of the capsule opening process for the embodiment disclosed in FIGS. 5 and 7.

DETAILED DESCRIPTION OF EMBODIMENTS OF THE INVENTION

Figure 1:
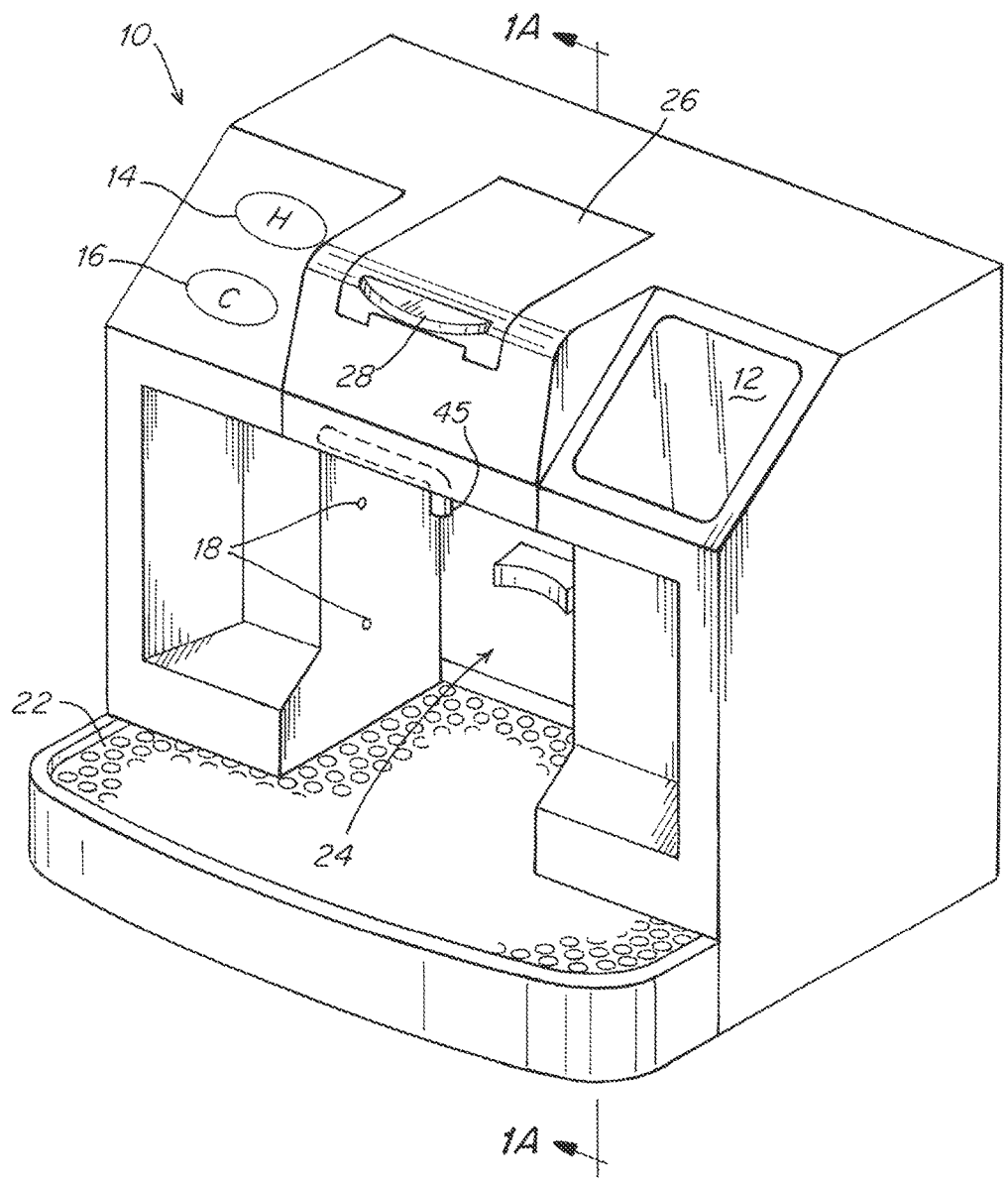
FIG. 1 is an isometric view of an exemplary embodiment of the present invention.

The present invention relates to dispensing of a substance from a container by means of a dispensing apparatus. Specifically, the exemplary embodiments of the present invention relate to (1) a capsule and (2) a dispenser with a mechanism for opening a capsule and (3) an automated method of dispensing of the contents from such container into a customer receptacle or glass with an option to eject capsule at the end of the drink preparation cycle. Each of these areas will be described in more detail below:

(1) The Container/Capsule

The capsule is comprised of three parts, all of which, in a preferred embodiment are made from aluminum, though other materials, such as biodegradable materials and plastics are possible with the present invention:
aluminum foil covering the top of the capsule,
a receptacle for holding the mixing agents, which may be in powder form and also in liquid form. The receptacle may a variety of shapes, such as an oval which has been cut in half when the receptacle is viewed from the top, and
a more rigid top edge of the receptacle which may be formed from the same or different material from the receptacle and to which the foil is affixed by some bonding agent, such as glue.

In one embodiment of the invention, the capsule comprises a preformed body or receptacle defining a filling cavity. The body has an opening and an integral planar circumferential rim surrounding opening The opening is closed by a cover sheet which is sealed to the circumferential rim by means of a circumferential sealing glue.

The circumferential rim has a flat dispensing part on either end which is covered by the cover sheet e.g. aluminum foil, which cover sheet is sealed to the dispensing part by at least two outwardly directed sealing seams on each side, joining the circumferential sealing seam and extending at a distance from one another from the circumferential sealing seam to the edge of the dispensing part on either end.

A weakened seal extends between the two directed sealing seams on the perpendicular sides: The notch between the two points is directed towards the cavity and the weakened sealing seam joins the respective outwardly directed sealing seams at a distance from the location where the respective outwardly directed seals join the circumferential seal.

There are two sizes of capsules, one approximately 20 cc and another approximately 40 ccs. Of course, other sizes are contemplated in this invention. One difference between the two sizes is the volume of the receptacle part of the capsule, which in the larger version is longer and more voluminous as it is able to hold more mixing agent(s). The tops of the capsules are identical allowing them to fit in the same chamber feeding and ejection mechanism in the machine. The capsule contains a powder or a liquid concentrate. According to an embodiment of the invention the substance, e.g. powder or syrup or substance for energy drink or other drinks is dispensed directly from the container into a serving container, e.g. a cup or a bottle. Also the water is dispensed into the serving container such that mixing may take place in the serving container thereby preventing the contamination of the dispensing apparatus with the substance. The capsules are described in more detail in connection with the illustrations below.

(2) The Dispenser for Opening Such Capsule

Another aspect of the invention is the dispenser for opening the capsule. In general, to operate the machine, a user lifts a lid located at the top of the machine. The user would then insert the aluminum capsule into the tray slot or sized opening to hold the capsule and closes down the lid. An optional optical scanner can be used to read an optional barcode on the capsule to ensure the proper mixing process is activated by a control system which could include a central processing unit. The capsule is opened by a process of pinching and peeling the capsule. In one embodiment the edge of the capsule rim is pinched tightly by the lid mechanism and some of the top of the capsule is peeled off by a feeder mechanism that grabs the trailing end of the capsule and breaks open the seam and then pulls on the cover to peel the cover away from the capsule. This initial portion of the seam may require the most force to open and can be accomplished by the user. When the cover breaks the seal, a servomotor that produces less torque can be selected to reduce cost and complexity of the machine. In this embodiment, the capsule can be rotated (e.g., swung down about 45°-90 from horizontal) to facilitate the breaking and peeling of the cover on top part of the capsule.

A support surface or rim supports the cover sheet and keeps the leading edge firmly gripped, but allows the cover sheet to peel along the outwardly directed sealing seams on the dispensing part of the rim and down along the sides. The seams may be optional if upon the selection of an appropriate cover material or configuration enables the tear consistently along a desired path at a predetermined force. This way of opening the container requires no cutting means or other means adapted to open the container that could be contaminated with the substance, which is advantageous in view of hygiene and avoiding cross contamination. Of course, as described in an alternative embodiment below, the capsule can be opened along a crease by opening one or both edges. In either configuration, the capsule is provided with a concave shape of the leading edge of the capsule has the beneficial effect of directing the flow of the mixed product so that splashing and contamination of the dispensing apparatus is reduced or prevented.

(3) The Automated Method of Dispensing of the Contents from Such Container

The present invention contemplates a "cold infusion" Process in which the beverages in the La Vit machine are prepared through a cold "infusion" so that the maximum mixing per capsule is possible. A user introduces an individually packaged capsule to a machine.

According to another aspect of the invention the substance, e.g. powder, syrup or other substance for an unsweetened or other drinks is dispensed directly from the container into a serving container, e.g. a cup or a bottle. Also the water is dispensed into the serving container such that mixing takes place in the serving container thereby preventing the contamination.

Beverage Mixing: As the capsule enters a 45°-90° degree pouring angle, water is injected into the capsule and the powder or liquid inside the capsule is mixed with the filtered water. Most or all of the mixing of the powder is achieved inside the capsule. The powder is agglomerated and highly solvable by nature.

Optional Secondary Mixing: The water based mix feeds down via gravity into a "funnel" or "capture tray" where a secondary mixing occurs. This secondary mixing will take place with the aid of water introduced into the side of said funnel whereby a vortex created in the second mixing chamber. The funnel creates a vortex, which is complemented by a second nozzle that adds more water to the mix. The mix then feeds down the funnel and out the dispenser nozzle into a drink receptacle. This step is optional and will depend on the machine model.

Pour Quality: The beverage exits the capsule (or the secondary mixing chamber) and pours directly into the customer receptacle/glass. The primary stream leaves the capsule and gravity feeds into the customer receptacle.

Finish Stream: A relatively pressurized secondary stream of filtered water is injected directly from the customer receptacle/glass causing an agitation in the glass, and thereby causing any unmixed powder or liquid to fully mix in the beverage contain—(e.g. glass).

Description of Exemplary Embodiments Illustrated in the Drawing Figures

Figure 1A:
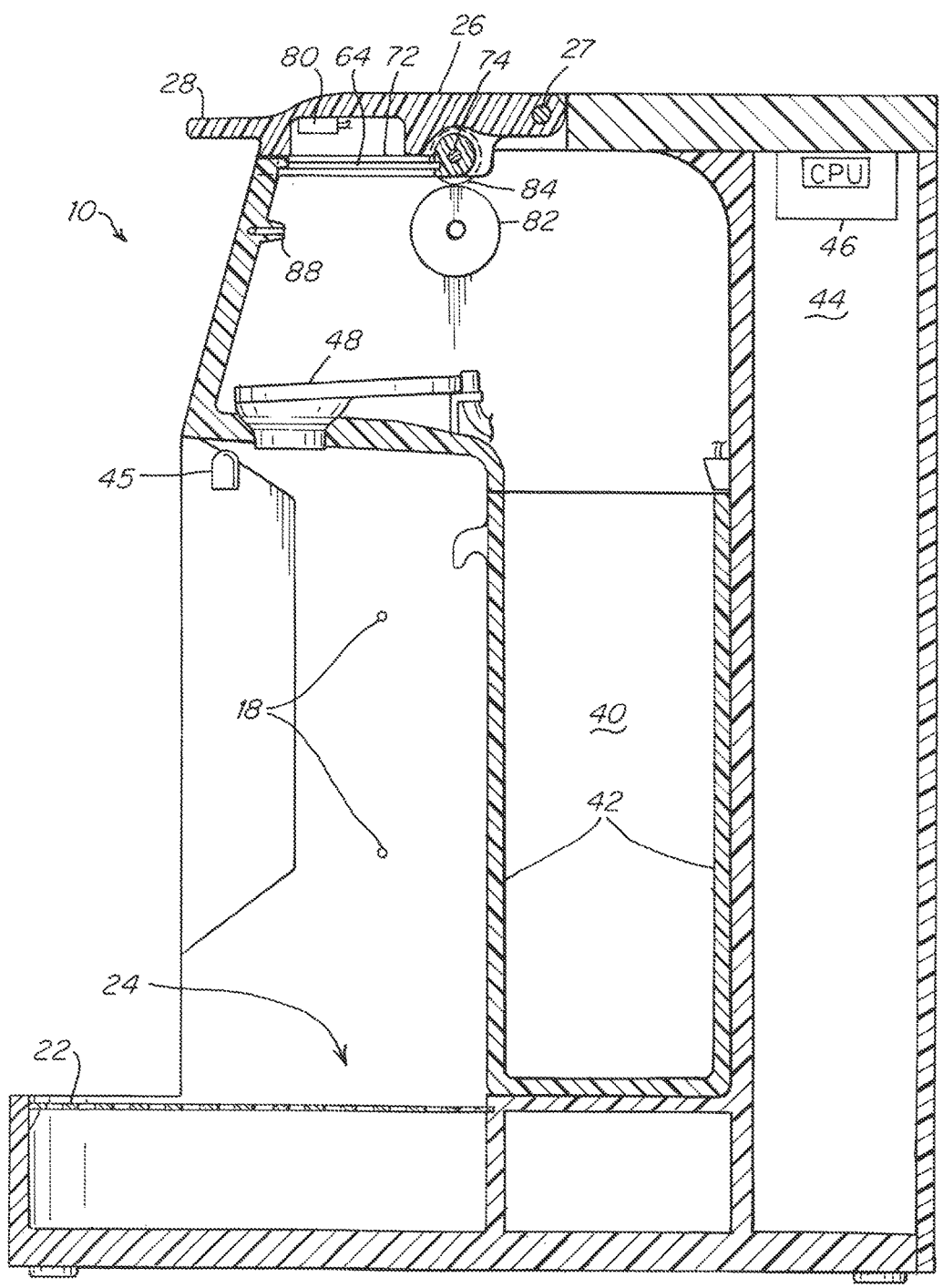
FIG. 1A is a cross section taken along section lines 1A-1A in FIG. 1.

FIG. 1 is an isometric view of an exemplary beverage dispenser 10 of the present invention and FIG. 1A is a cross section taken along section lines 1A-1A in FIG. 1. The beverage dispenser 10 is suitable for a home or business environment. As illustrated the dispenser 10 is generally rectangular shaped and is adapted to be located on a kitchen counter or some suitably sized table. While the overall size of the device is about a 30 cm tall, 20 cm cm deep and 35 cm wide, the particular dimensions can change without departing from the scope of the invention recited in the specification.

The dispenser 10 includes an optional display 12 for conveying dispenser status information (such as dispensing, mixing, capsule not sized properly) or for other information that may be useful to a user, including information about the beverage being dispensed (such as calorie count, ingredients, producer information) or even advertisements. The advertisements can be associated with particular beverage choices so that if, for example, a person chooses a vitamin filled drink, an advertisement may be oriented to associated health related products or stores that sell associated health related products. FIG. 1 illustrates step 1 where the device provides the user with initial instruction, such as, "select a beverage capsule", "lift handle" and "insert capsule". The instruction may have step numbers or letters associated with them to assist during the operation of the machine. Various images or icons can be used to represent the steps or instructions. The icons can represent a step of the process or they can represent a condition of the machine, e.g., available, working, etc. or they can represent a condition of the beverage, e.g., hot, tepid, cold, etc.

For example, the display can be programmed to illustrate the steps of the beverage dispensing process. Step 1 of the dispensing process may include the display that provides the user with initial instruction, such as, "select a beverage capsule", "lift handle" and "insert capsule". The instruction may have step numbers or letters associated with them to assist during the operation of the machine. Various images or icons can be used to represent the steps or instructions. The icons can represent a step of the process or they can represent a condition of the machine, e.g., available, working, etc. or they can represent a condition of the beverage, e.g., hot, tepid, cold, etc. Another step, e.g., step 2, of the process may include a display in which information from the device is displayed, for example, the device senses a step taken, for example, a capsule has been inserted into the machine. The screen illustrates a request to "dispense" so that the process of dispensing can begin. The user may then press the touch screen button or icon to begin the process of dispensing. Alternatively, a button on the machine may be used instead of or in addition to the touch screen control. The instruction can be separate from the icon which would start the beverage dispensing process or it could be on the overlap with the instruction. An additional step, e.g, step 3, can be where the display is used to show the status of the machine during the dispensing process. An icon and/or words or phrases can be used to display the status of the machine. A final step, e.g., step 4 may be an exemplary screen display suitable for notifying the user that the beverage is ready and the dispensing process is complete. Again, word or icons may be used to communicate the message to the user. Also, although four steps are used to describe the process, the present invention contemplates the use of the touch screen beverage dispensing process with more steps as part of the dispensing process. Fewer steps are also envisioned and are within the scope of the invention. Of course, other lights, such as LED lights may be used to illuminate various portions of the machine and the dispensing compartment in a manner that can provide additional lighting and/or communicate information to the user. The capsule bar code allows the machine to read the capsule and display information related to the capsule or the correct movie. The programming can be updated suing a USB key or wirelessly.

Actuator buttons 14 and 16 are provided to enable the user to select a particular beverage. Button 14, for example, can be selected for dispensing hot water and have an appropriate indicia to inform the user of the dispenser what the selection could be, in the illustration "H" is used. Alternatively, other indicia may be used such as color (e.g., red) or a wavy lines above a liquid symbol. Button 16, may be used to initiate a beverage dispensing cycle where cold water is used to mix the beverage and an appropriate indicia (such as the letter "C" can be used. Of course, other types of symbols may be used to indicate the actuator for dispensing a cold beverage. Additionally, optional sensors 18 may be used to determine the presence of a beverage container (not illustrated in FIG. 1) in an appropriate filling location 24 on the tray 22 of the beverage dispenser.

The dispenser 10 includes an open-able door or cover 26 actuated by a handle 28. The cover 26 is illustrated as being on the top of the dispenser but could be on the front or sides of the dispenser. The cover or door is used to access the capsule receiving compartment 30 portion of the dispenser and as illustrated in FIG. 1A the cover includes a pivot 27 which enables the door to swing open. Of course, other types of mechanisms can be used. A mechanism for mixing and dispensing a beverage is according to an embodiment of the invention is described below. A removable bin 40 with sides created by walls 42 may be used to store used capsules as described below. A rear portion 44 of the dispenser 10 may be used to house a CPU and other electronic components 46, a water container (in FIG. 1A) or a chiller (referenced in FIG. 9) for cooling water. A heater (referenced in FIG. 9) useful for heating water may be supplied. As an optional desirable feature, the beverage dispenser may include a window showing the actual filter or a representation of a filter which communicates to the user that the water moving through the system is being filtered.

As illustrated in FIG. 1A, the dispenser 10 also includes an optional mixing funnel 48 which can be used to guide the water into the beverage container and assist in the mixing process. The mixing funnel can shaped in a variety of ways and serves to guide the beverages. The mixing funnel may be optionally provided with a nozzle 92 dispensing a secondary mixing stream 94. Additionally, other type of beverage guide structures can be used to guide the fluid into the beverage container. For example, although not illustrated in this embodiment, the fluid can be guided along the inside, or even outside, of a tube or cylinder so that the stream is smoothed out. The finishing tube or cylinder can be in addition to or in the place of the mixing funnel.

Instead of or in addition to the mixing funnel 48, a nozzle 45 can provide a finishing stream of liquid 230, e.g. Water. The location of the finishing stream nozzle 45 is preferably in front of (from the view of a user) the mixing stream from funnel 48, if present, or the mixing stream from the capsule as described in detail below. The finishing stream can be used in addition to the mixing stream, in place of the mixing stream (should the user only want a filtered beverage). If the beverage mix within the capsule is deposited in beverage container without the mixing stream, the finishing; stream can mix the beverage in the mixing container. Additionally, when the finishing stream is used, as described in more detail below, the turbulent (and perhaps less aesthetically pleasing) stream can be covered by the more laminar finishing stream thus providing the user a more aesthetically pleasing beverage dispensing experience.

Figure 2:
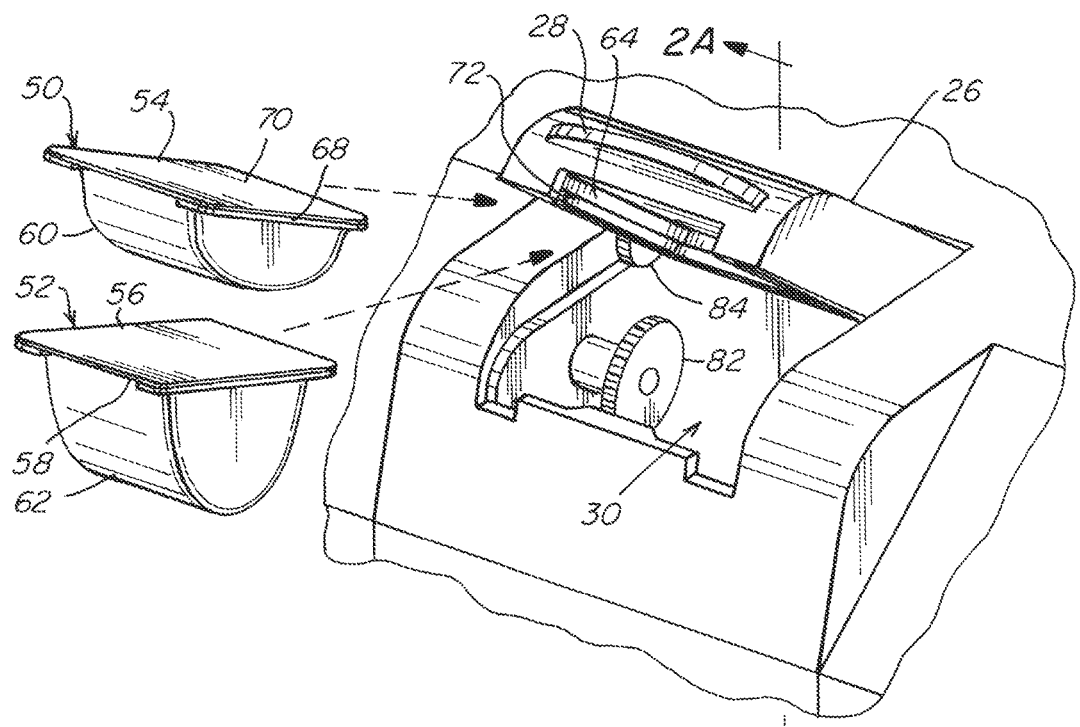
FIG. 2 illustrates a detail view of a capsule insertion in the embodiment of FIG. 1.
Figure 2A:
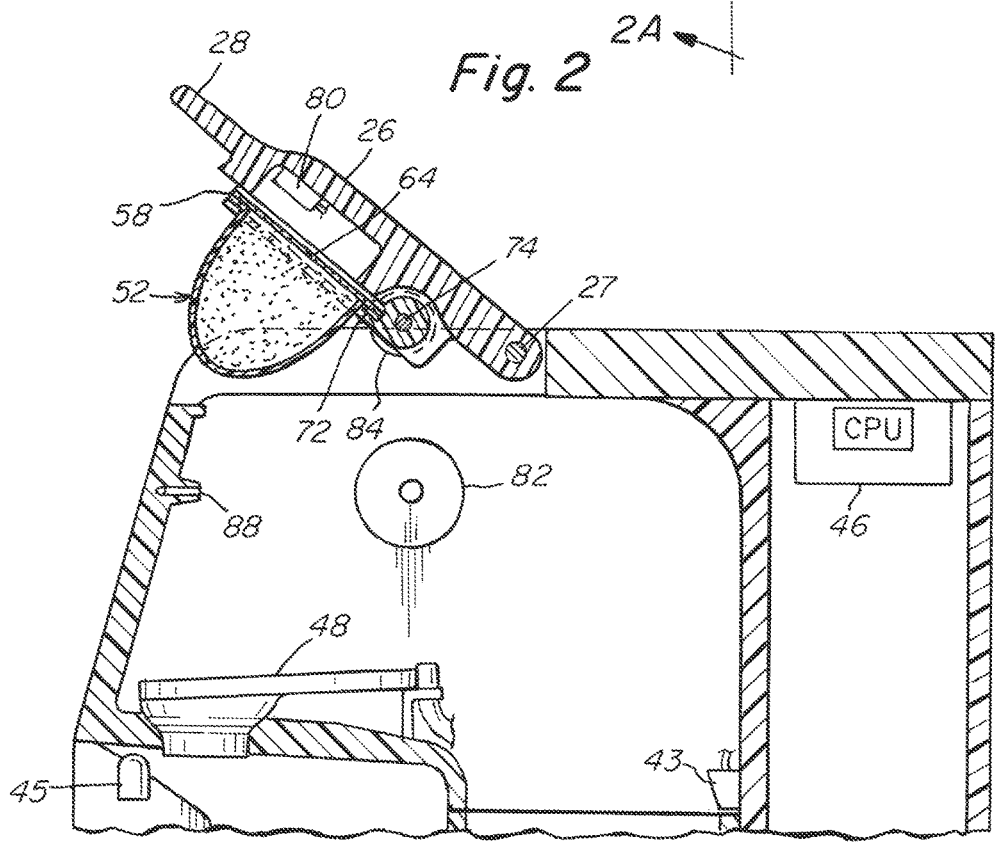
FIG. 2A illustrates a detail cross section taken along section lines 2A-2A in FIG. 2 with a capsule inserted in the dispenser device.
Figure 2B:
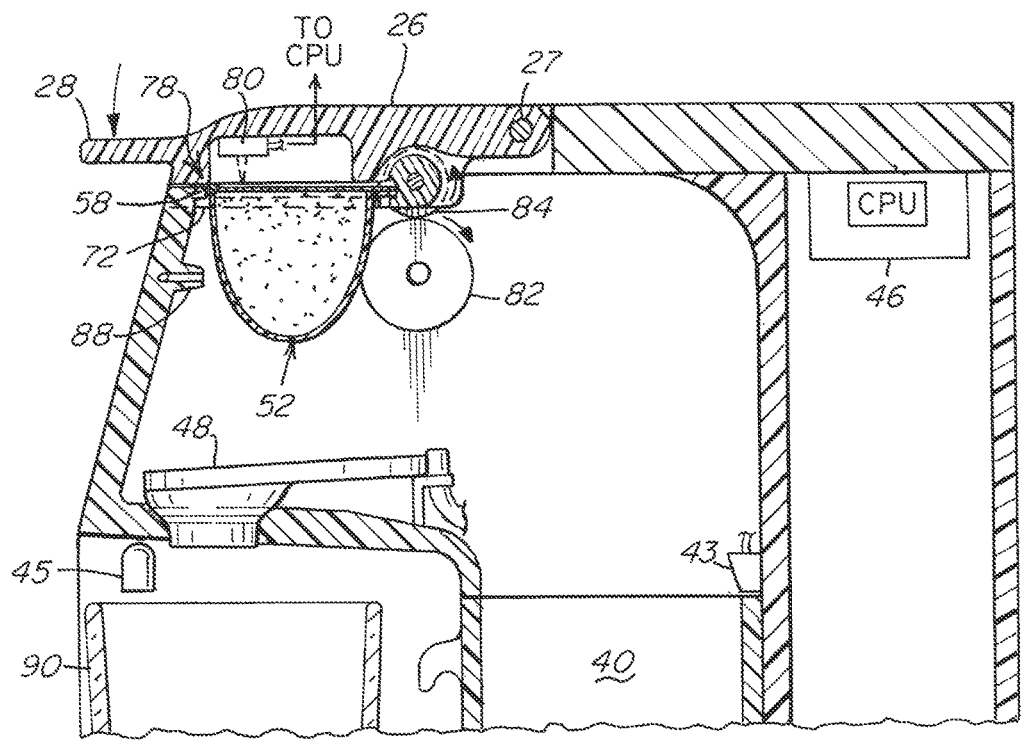
FIGS. 2B-2D illustrates the capsule opening process and beverage mixing according to a first embodiment of the invention.

FIG. 2 illustrates a detail view of a capsule insertion in the embodiment of FIG. 1 and FIG. 2A illustrates a detail cross section taken along section lines 2A-2A in FIG. 2 with a capsule inserted in the dispenser device. FIG. 2A also illustrates two capsules 50, 52 which can be used to contain the mix which can be mixed by the dispenser 10. In this embodiment of the invention, the capsules have a rectangular (or square) top 54, 56, respectively with a arched curved bottom 60, 62, respectively. The arched surface configuration can be modified to fit more or less beverage mix. For example, a smaller capsule 50 may contain 20 ccs of material and the larger capsule 52 may contain 40 ccs of mix. A larger capsule 52 may be desirable for more mix to produce a stronger beverage, sweetener to produce a sweeter beverage or for any material that may be mixed that can take up more volume than available in the 20 cc size. The elements of capsules 50, 52 are described in more detail, which include a lip 68 onto which is disposed (usually with glue, not shown) a cover 70 which may, in an embodiment be foil. The lip provides rigidity for the capsule. In a preferred embodiment, a foil cover is glued or otherwise sealed to the lip so that it is securely attached to the capsule and the material is sealed within the capsule until dispensed by the dispenser.

FIGS. 2A-2D illustrate the capsule opening process and beverage mixing according to a first embodiment of the invention which can be described as a pinch and peel process. As described in more detail below, a portion of the foil is securely held ("pinched") and then a mechanism swings the capsule to tear or "peel" the capsule to open it up enabling the beverage to be mixed. Thus the opening method for the capsule for this embodiment is by tearing or peeling the top foil of the capsule so that the beverage can (optionally) be mixed in the capsule itself to reduce the process of contaminating the dispenser with powder or unmixed drink that could allow for bacteria to grow. A capsule 50, 52 is selected for mixing the beverage and fits within the slot 64 on a frame 72 that swings on a hinge 74 during the dispensing process as described below. Once a capsule 50, 52 is slid into the slot 64 so that it is securely held on three sides (FIG. 2A) the cover 26 is closed on a hinge 27 in a direction illustrated by an arrow.

An optical reader 80 may be used to scan information from the capsule so that information about the capsule and its contents may be processed in a CPU containing the electronic package 46 (shown schematically in FIG. 1) of the beverage dispenser 10. In that way the beverage dispenser can ensure that any programmable variables (e.g., temperature, volume, mixing parameters, etc.) may be incorporated into the mixing process of the beverage dispenser for a particular drink.

Figure 2C:
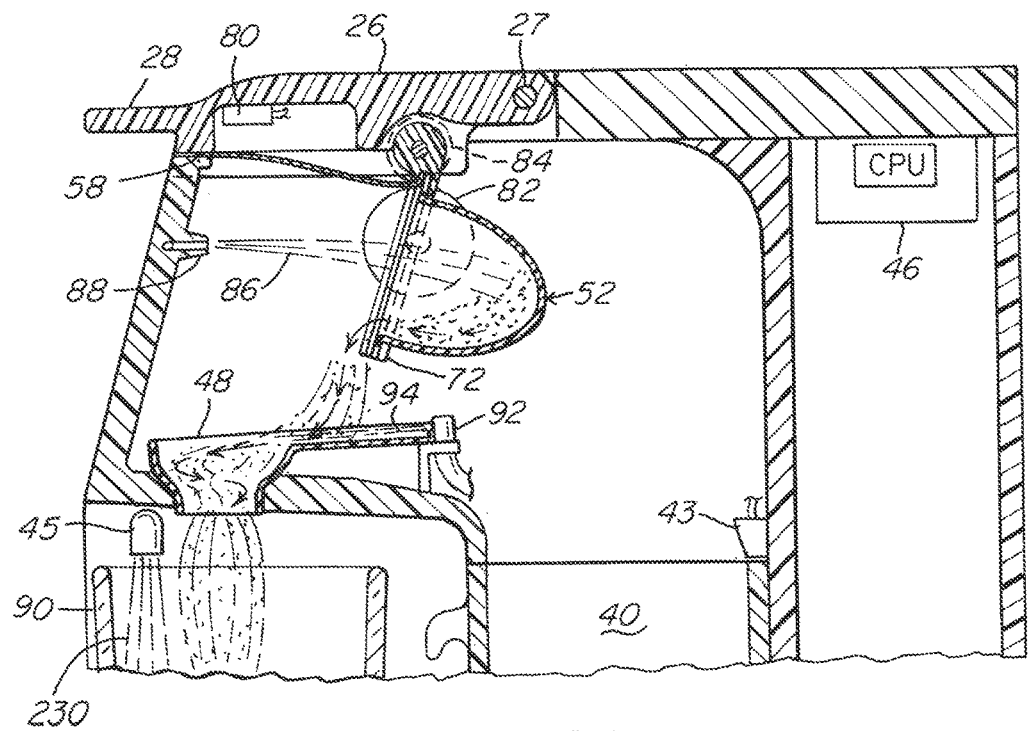

Returning to the process of opening the capsule, as the user closes the lid, the lid (or some other part of the feeder mechanism 78) grabs the trailing end 58 of the foil and "breaks" open the seam. This initial first portion of the seam is the hardest to open and is accomplished by the user by pressing down on the lid 26. Once cracked open, a servo motor (not shown) rotates a gear 82 that in turn rotates a follower gear 84 that swings the frame 72 around hinge 74. As the frame 72 swings down a portion of the cover 70 that is held stationary and the remainder of the capsule swings down as illustrated in FIG. 2C. Optionally, the capsule is "cracked" open by the force of the cover and not by the servo-motor inside the dispenser. This allows the use of a smaller servo motor and ensures its longevity. In this mechanism, the foil is not punctured at all, thus reducing the possibility of contamination by whatever may be on the puncturing surface. The separation from the cover sheet from the dispensing part of the capsule then progresses along the weakened seal towards the outwardly directed sealing seams. This way of opening the capsule requires no cutting means or other means adapted to open the capsule that could get contaminated with the substance, which is advantageous in view of hygiene and avoiding cross contamination. Also illustrated in FIG. 2C, a mixing stream 86 is provided from nozzle 88 which mixes the contents of the capsule in the container and then the mixing stream is allowed to flow into mixing funnel 48 by a secondary nozzle 90 and 92 (FIG. 2C) so that the mixed beverage can be guided (and perhaps further mixed) in the funnel as it is directed to the mixed beverage container. An optional, though often desirable, finishing stream can be directed downward in a direction toward the beverage container 90. The finishing stream 230 from nozzle 45 can help mix the beverage (out of the capsule) and direct the mixed beverage to the glass 90. The funnel may be optional if the finishing stream is optimally and appropriately designed.

Figure 2D:
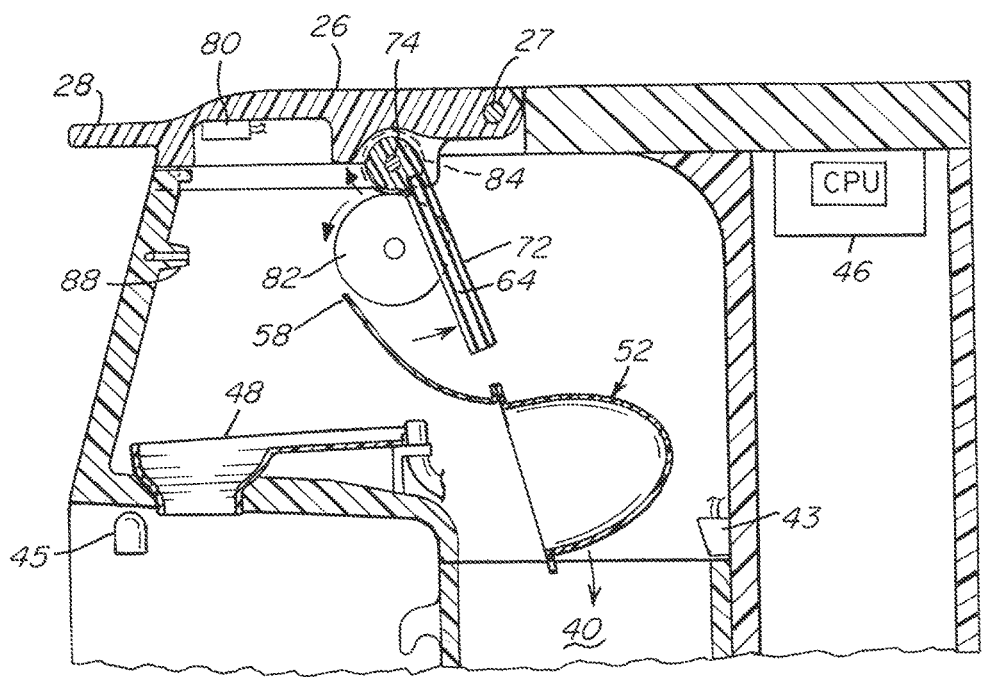

Once the beverage is dispensed, the capsule is ready to be placed in the used capsule bin of the beverage dispenser as illustrated in FIG. 2D. The feeder mechanism releases the edge 58 of the foil from its secure location and the capsule can fall into the container by gravity. The frame is preferably oriented so that the slots direct the used capsule toward the used capsule container. The beverage is dispensed, the capsule has been disposed in the used capsule bin and the dispenser is ready to dispense another beverage. An optical detector 43 sense when the used capsule compartment is full and prompts a message on display 12 to empty the bin.

Figure 3:
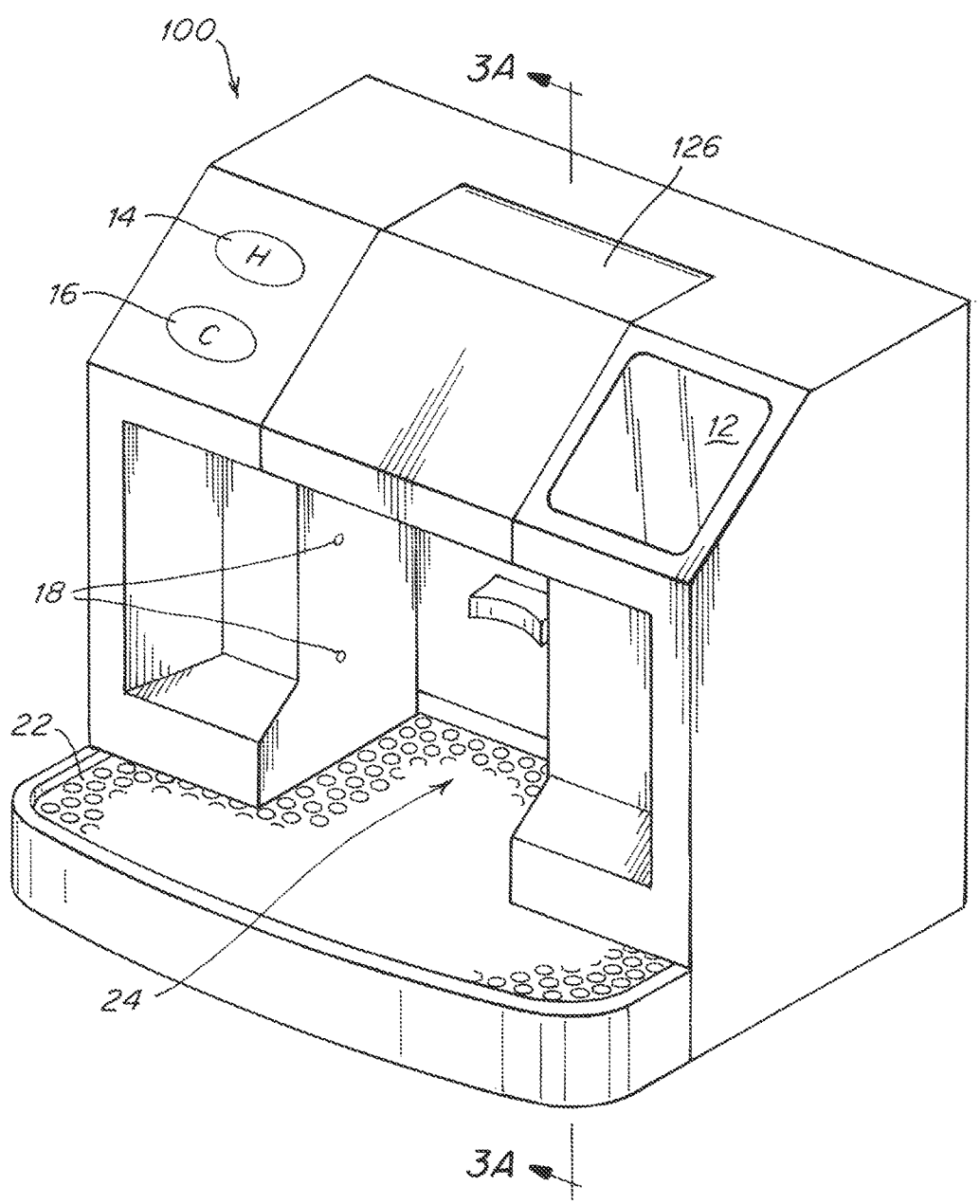
FIG. 3 is an isometric view of a second exemplary embodiment of the present invention.
Figure 3A:
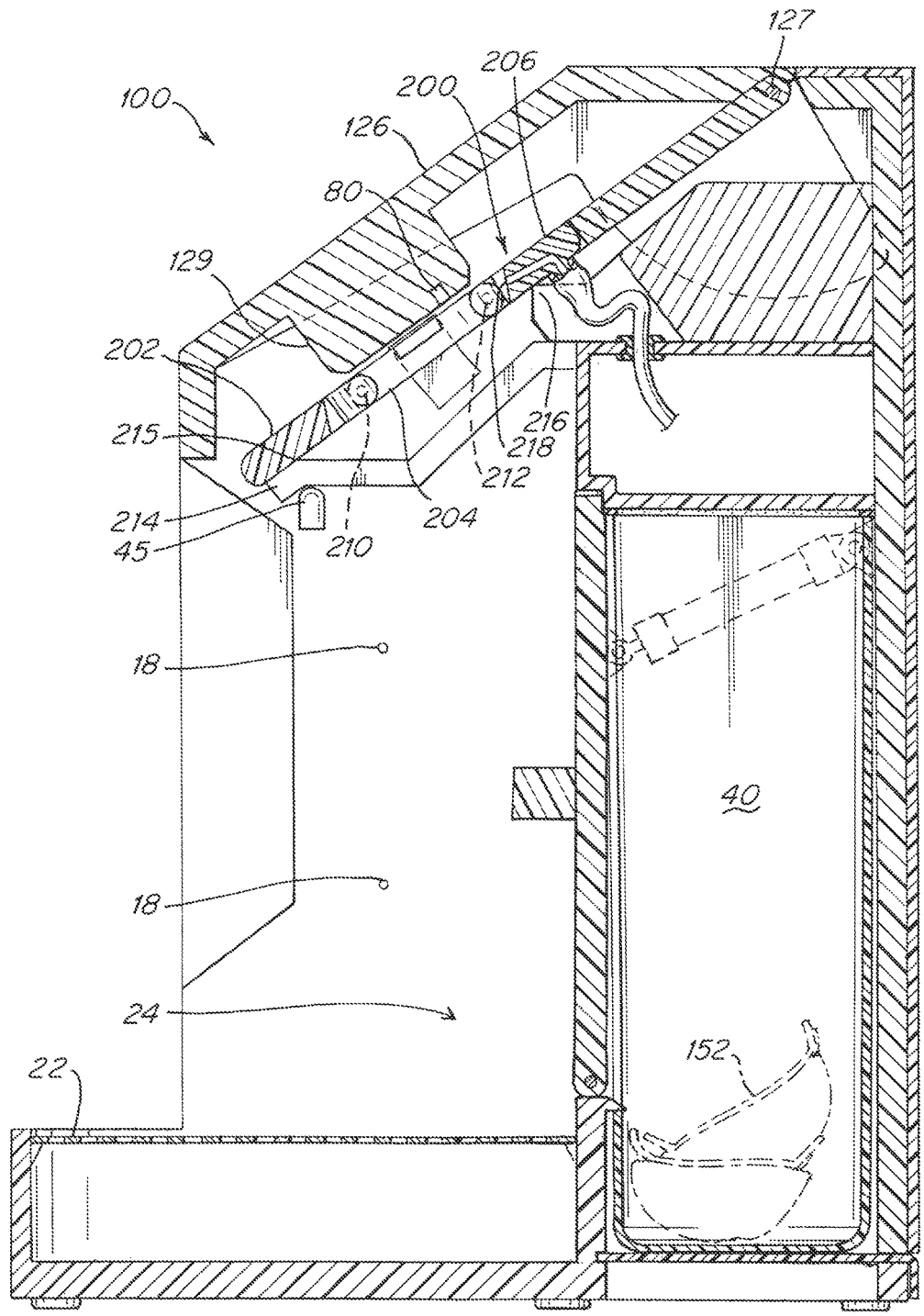
FIG. 3A is a cross section taken along section lines 3A-3A in FIG. 3.

FIG. 3 is an isometric view of a second exemplary embodiment of the present invention and FIG. 3A is a cross section taken along section lines 3A-3A in FIG. 3. In this embodiment one or both of the front and back edges of a specially constructed capsule are "cracked" open along a seam to allow the beverage device to be (optionally) mixed in the capsule. The overall shape and contours of the dispenser may be the same (and similar features of the dispenser housing are identified with the like numbers), the process of opening a capsule is different.

Figure 4:
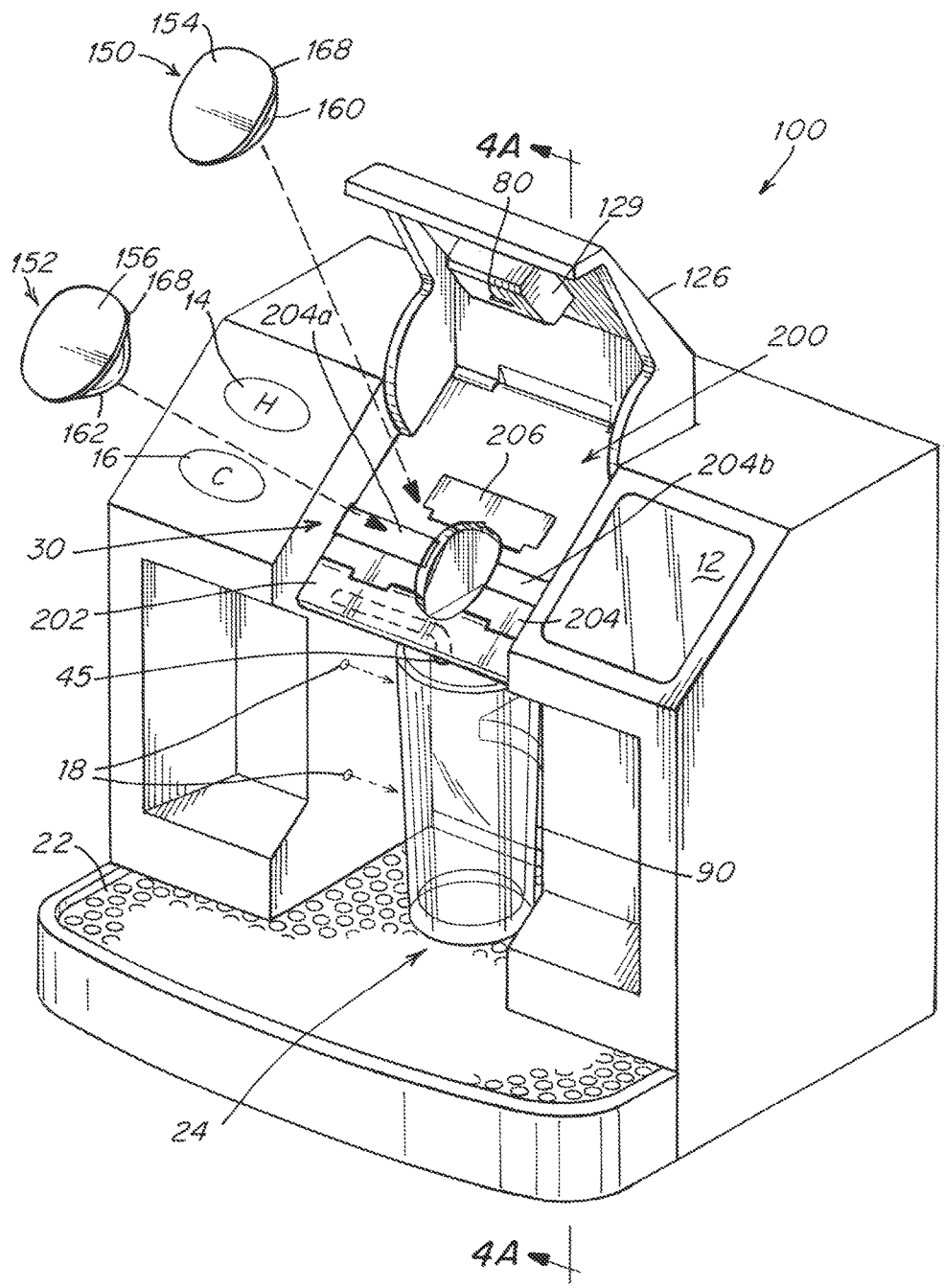
FIG. 4 illustrates a view of a capsule insertion in the embodiment of FIG. 3.
Figure 4A:
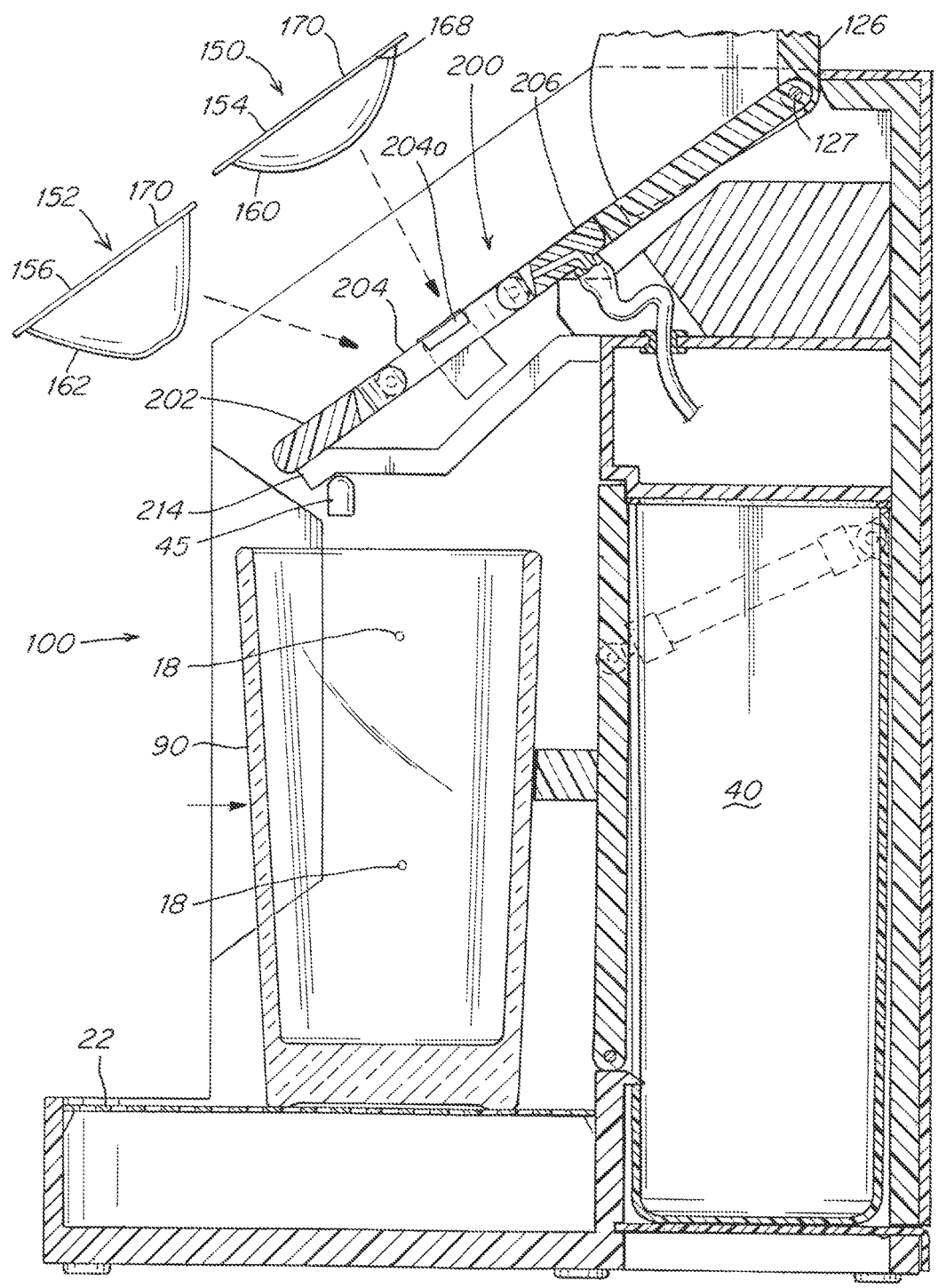
FIG. 4A illustrates a cross section taken along section lines 4A-4A in FIG. 4 with a capsule oriented for insertion into the dispenser device.

In the second embodiment the dispenser 100 includes a cover 126, the cover is configured to close about a hinge 127. A sensor 80 can be disposed in the housing to read symbolic instructions on the capsule. The capsules, illustrated in FIG. 4A, can be two sizes, a 20 cc and a 40 cc. The principle difference between the sizes is the volume of the lower part of the capsule. FIG. 4A also illustrates two capsules 150, 152 which can be used to contain the mix which can be mixed by the dispenser 100. In this embodiment of the invention, the capsules have a rectangular (or square) top 154, 156, respectively with an concave bottom 160, 162, respectively. The concave surface configuration can be modified to fit more or less beverage mix. For example, a smaller capsule 150 may contain 20 ccs of material and the larger capsule 152 may contain 40 ccs of mix. A larger capsule may be desirable for more mix to produce a stronger beverage, sweetener to produce a sweeter beverage or for any material that may be mixed that can take up more volume than available in the 20 cc size. The elements of capsule 50 are described in more detail, which includes a lip 168 onto which is disposed (usually with glue, not shown) a cover 170 which may be, in an embodiment, foil. The lip or rolled edge provides rigidity for the capsule. In a preferred embodiment, a foil cover is glued to the lip so that it is securely attached to the capsule and the material is sealed within the capsule. The capsules 150 and 152 are described in more detail in connection with FIGS. 15-20.

Figure 5:
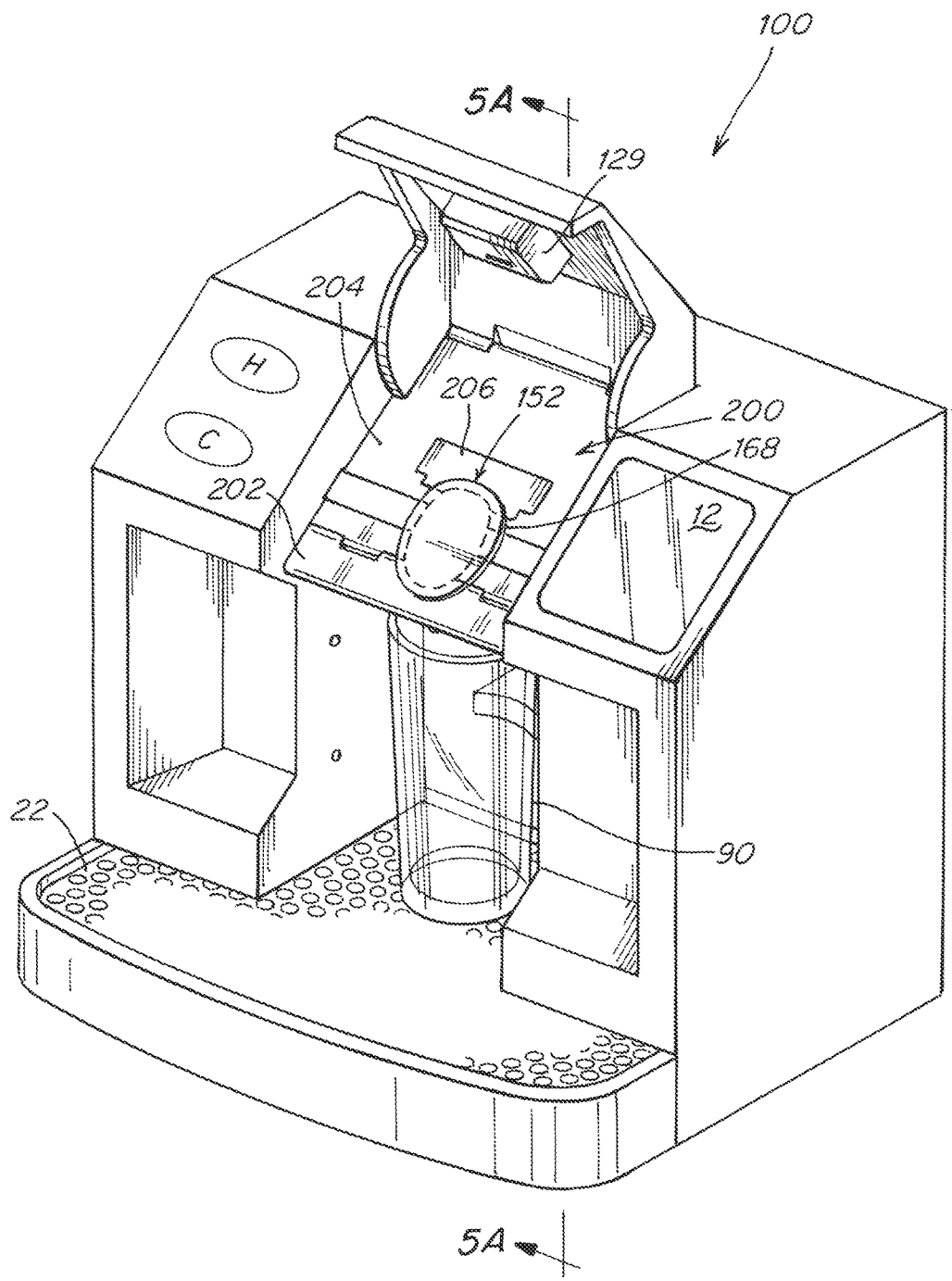
FIG. 5 is an isometric view of the second exemplary embodiment of the present invention with the capsule in the dispenser.
Figure 5A:
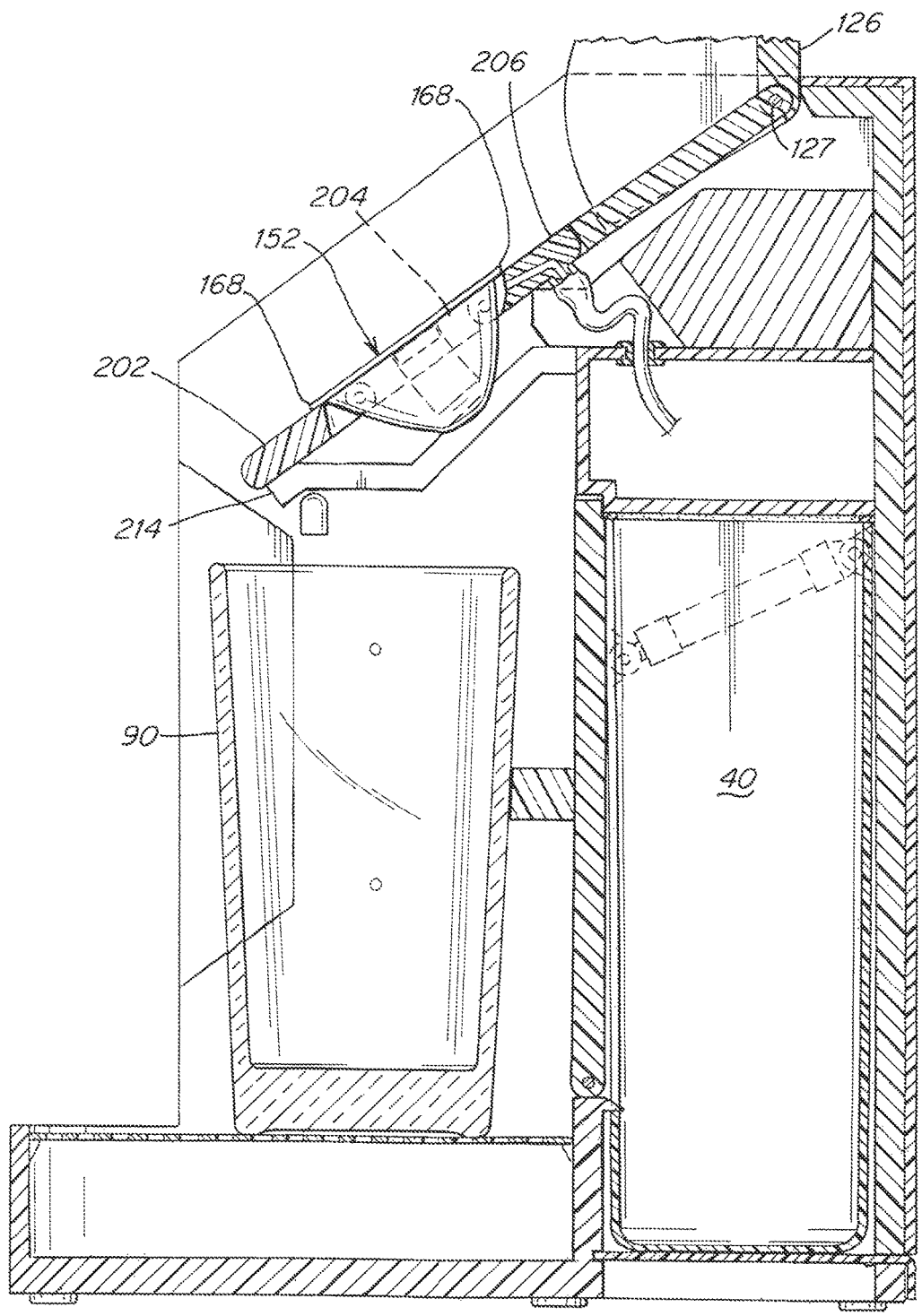
FIG. 5A is a cross section taken along section lines 5A-5A in FIG. 5.
Figure 6:
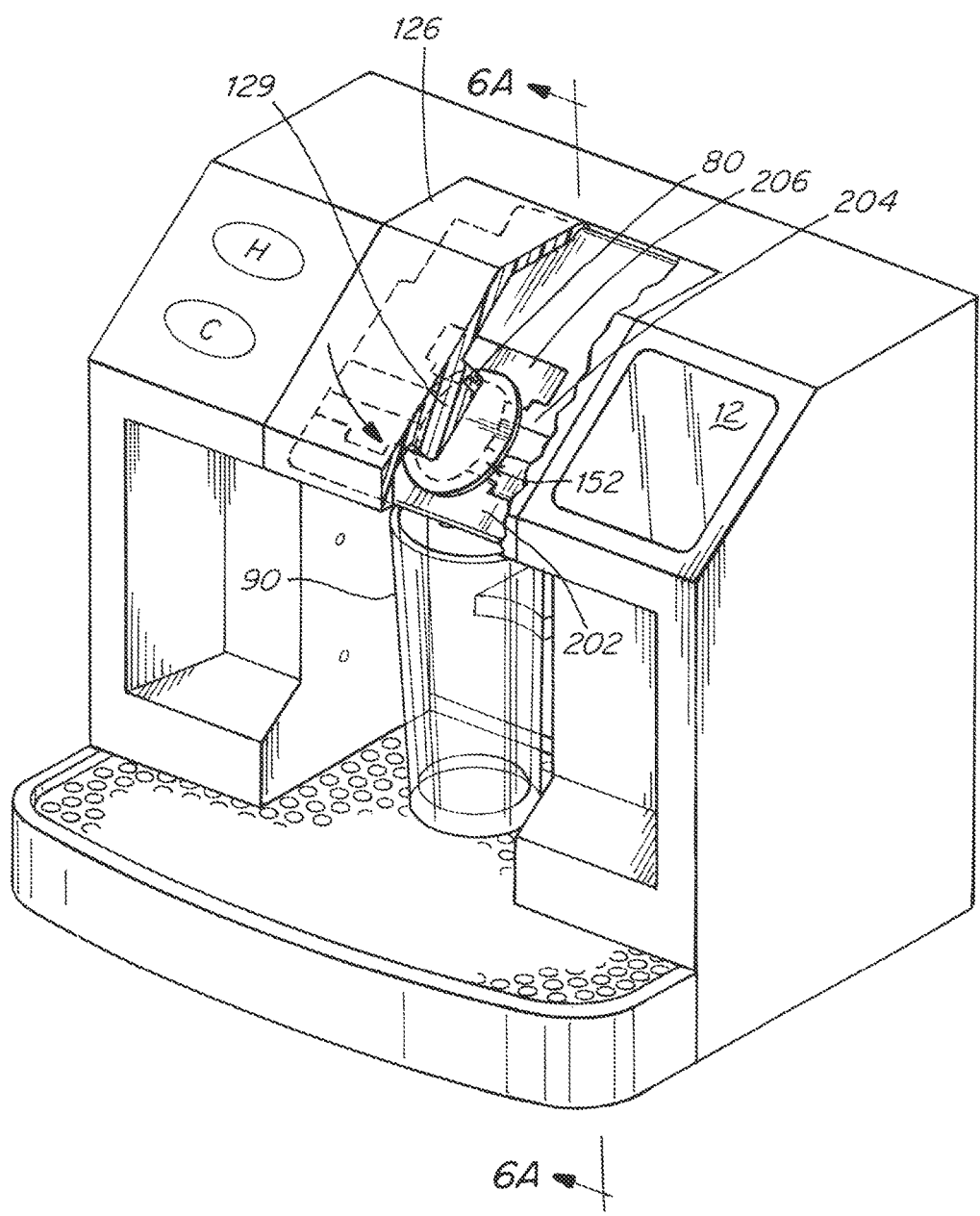
FIG. 6 illustrates a view of a capsule insertion in the embodiment of FIG. 5.
Figure 6A:
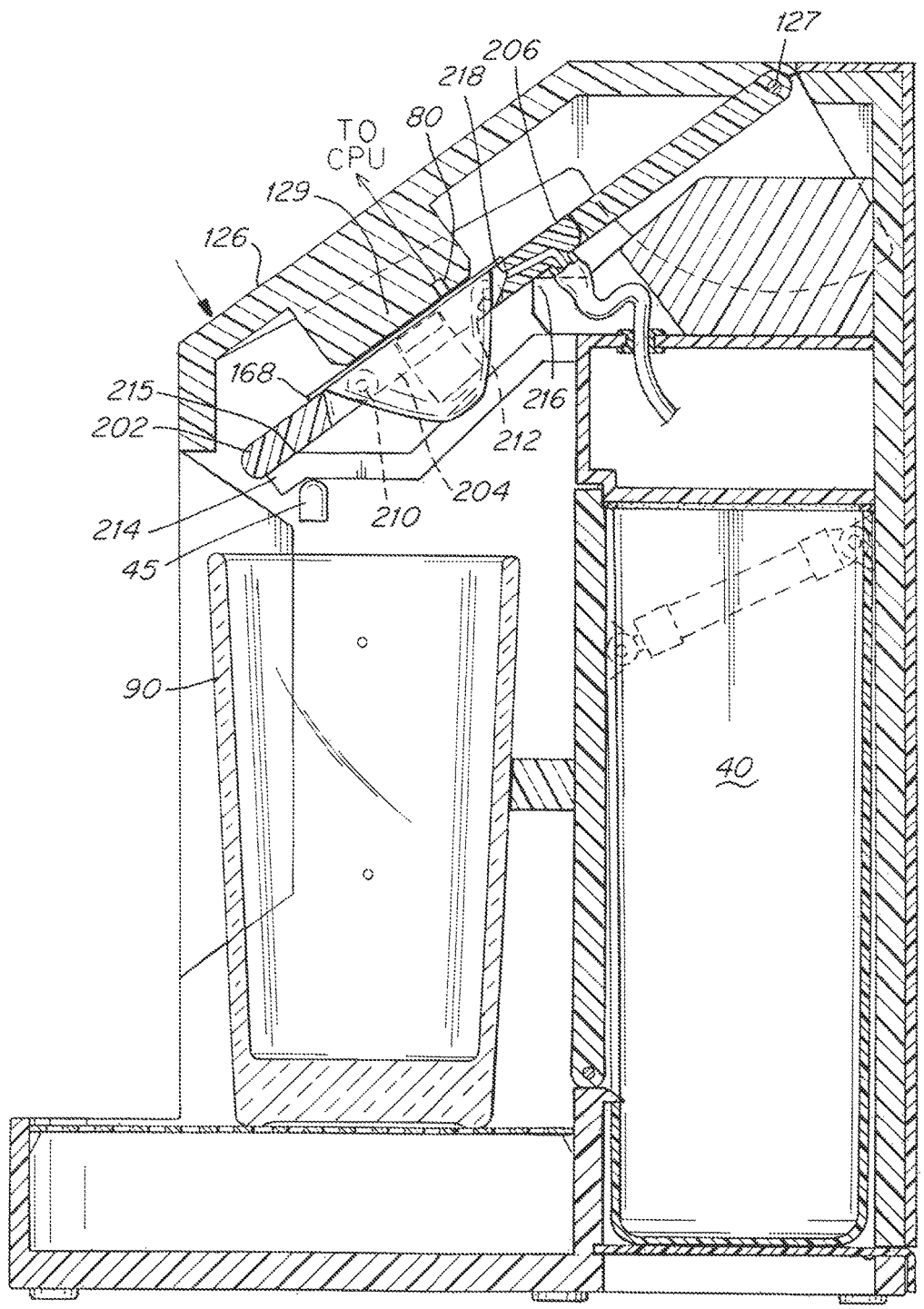
FIG. 6A illustrates a cross section taken along section lines 6A-6A in FIG. 6 with a capsule disposed in the dispenser device.

FIG. 5 is an isometric view of the second exemplary embodiment of the present invention with the capsule 150 in the dispenser 100 and FIG. 5A is a cross section taken along section lines 5A-5A in FIG. 5. FIG. 6 illustrates a view of a capsule insertion in the embodiment of FIG. 5 and FIG. 6A illustrates a cross section taken along section lines 6A-6A in FIG. 6 with a capsule disposed in the dispenser device. The capsule 150 or 152 is disposed in an opening in a frame 200 which is sized to accommodate the capsule at the base of the lip 168. Once disposed in the frame 200 as illustrated in FIGS. 5 and 5A, the cover is closed on a hinge 127 which closes the cover to the dispenser. As illustrated in FIGS. 6 and 6A, the cover includes a portion 129 that is disposed facing the top of the capsule in the frame 200. An optical reader 80 in the portion 129 scans information from the capsule and sends it to the CPU (not shown in this FIG.).

The frame 200 includes three sections 202, 204 and 206. Section 204 is the central portion of the frame and forms a seat to securely hold the capsule as the ends of the capsule are opened. Section 202, in the front of the capsule and section 206 in the rear are attached to the central portion 204 by hinge pieces 210 and 212 respectively. The hinge piece 210 allows the front section 202 to swing upward with respect to the central portion 204. Likewise, the hinge piece 212 allows the rear section to swing upward with respect to the central portion 204.

Figure 7:
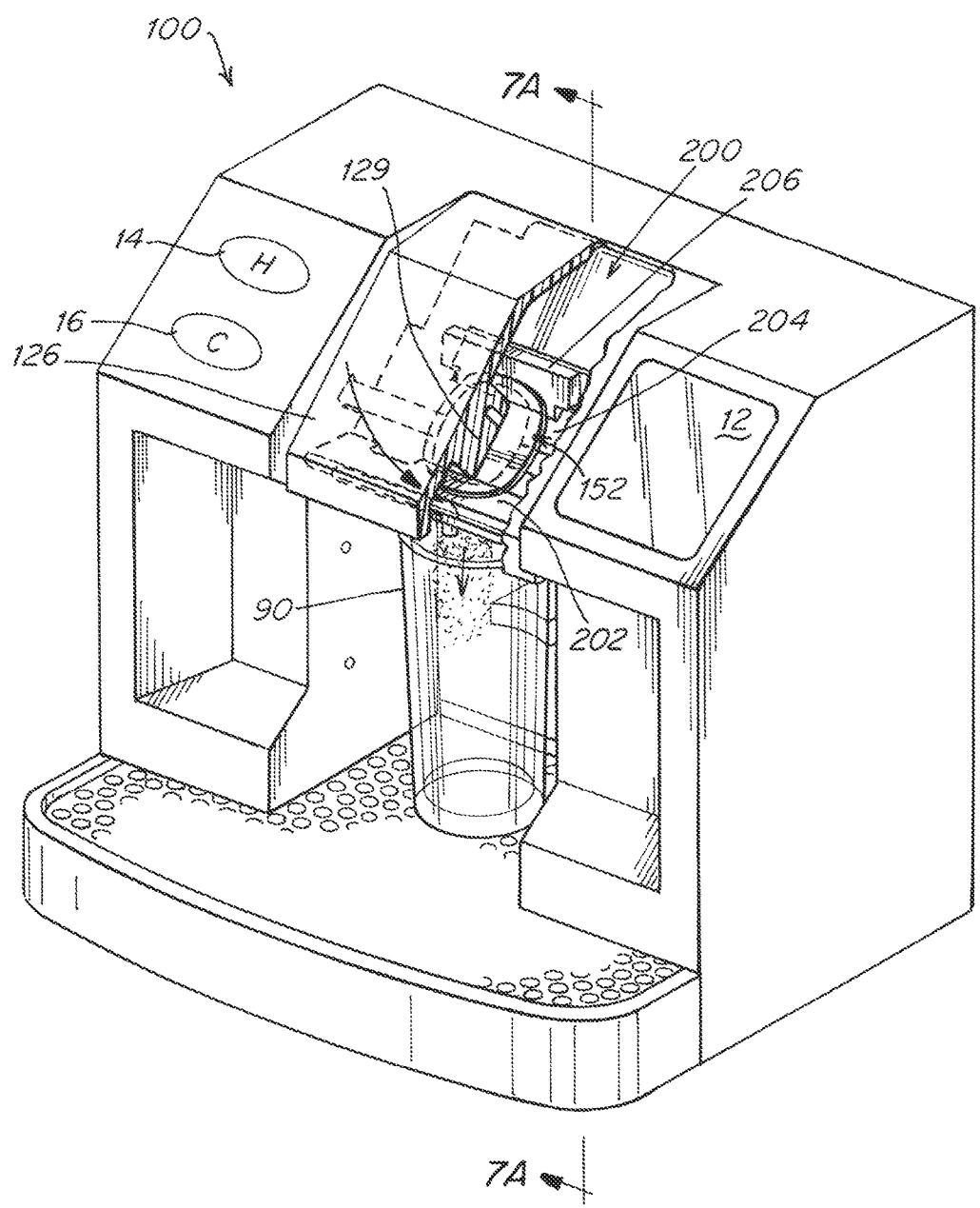
FIG. 7 is an isometric view of another exemplary embodiment of the present invention.
Figure 7A:
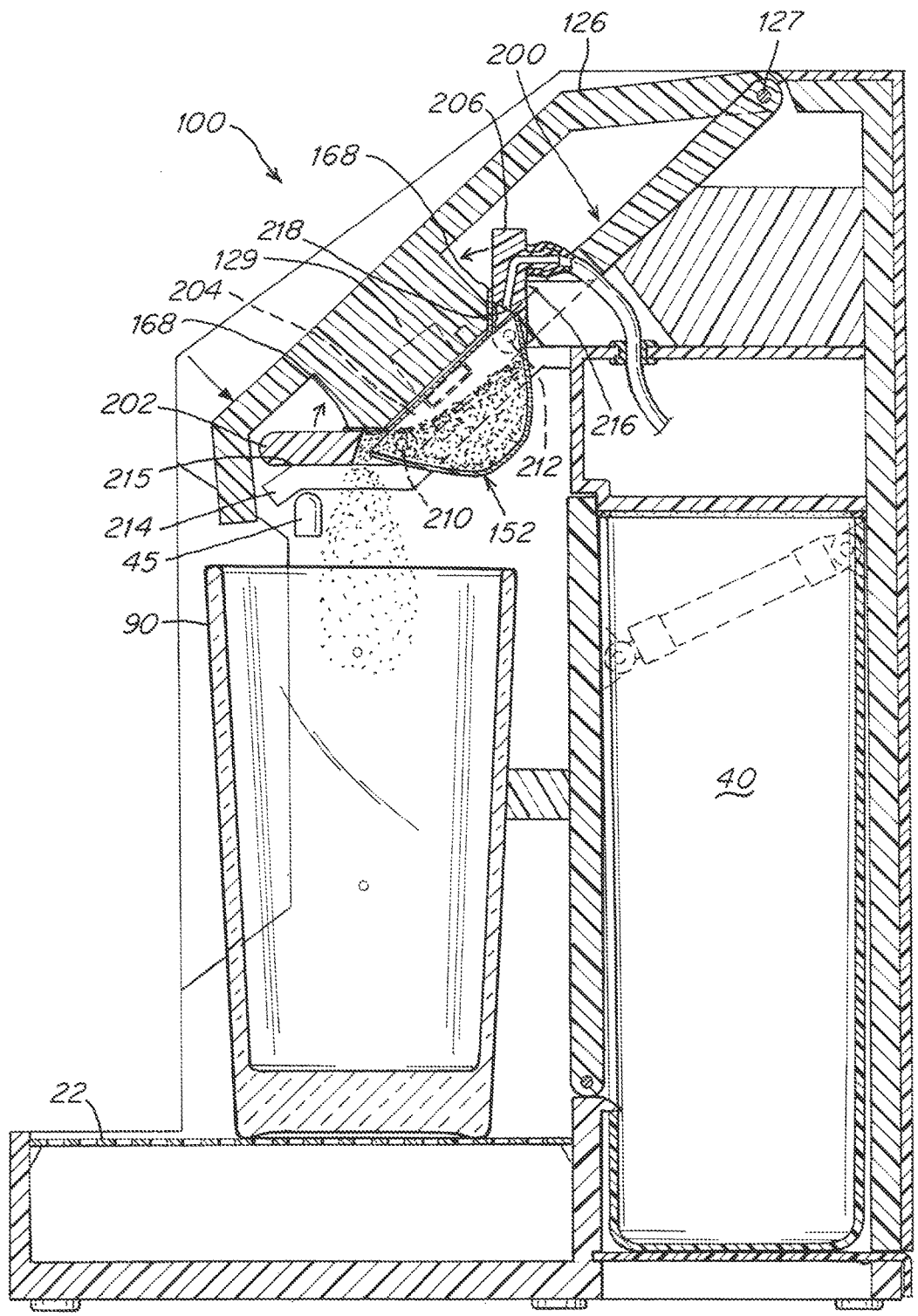
FIG. 7A is a cross section taken along section lines 7A-7A in FIG. 7.

In the position seen in FIGS. 6A and 6B the frame 200 can be considered to be in an "at rest" position with the front section, central portion and rear section aligned in a planar relationship by springs or the like (not shown). The front section 202 rests on side rails for guides 214. The rails 214 act as both cams and stops as described below. A further cam 216 sits just below the bottom surface of the rear section 206 as best seen in FIG. 6A. From the Position seen in FIG. 6A, the user manually presses downward on the front portions of the capsule lip 168 to pivot counter clockwise about hinge 212. Rails 214 act as stops when the capsule ends have been fully cracked open as seen in FIG. 7A. The user may then release the cover during the mixing and dispensing cycles as mechanism (not shown) retains the cover and frame in their full down positions until after the crush cycle. As detailed in connection with FIGS. 17-20, the capsule includes a crease that allows for a controlled crack and opening the ends of the capsule as illustrated in FIGS. 7 and 7A. It is the relative movement between the center portion 204 and the front and rear portions 202 and 206 enabled by the hinges 210 and 212 which allow the capsule to open. Of course, various mechanism can be used to create the relative motion between the front and rear sections and the central section. For example, the center section can be lowered by a servo mechanism or the front and rear sections can be moved with respect to the center section by a servo mechanism that would allow for hinged motion between the front section and the center section and the rear section and the center section. Additionally, while there are two hinged pieces, it is within the scope of the invention to include a single hinged piece and open only one side of the capsule to enable the mixture to pour out. Further, the terms front and rear are for orientation purposes and should not be seen as limiting the description of the invention. It is possible that the capsule could be oriented along an angle different than front to back illustrated and the pour mechanism could be adjusted accordingly. Moreover, the opening and mixing could be from front to rear.

Figure 7B:
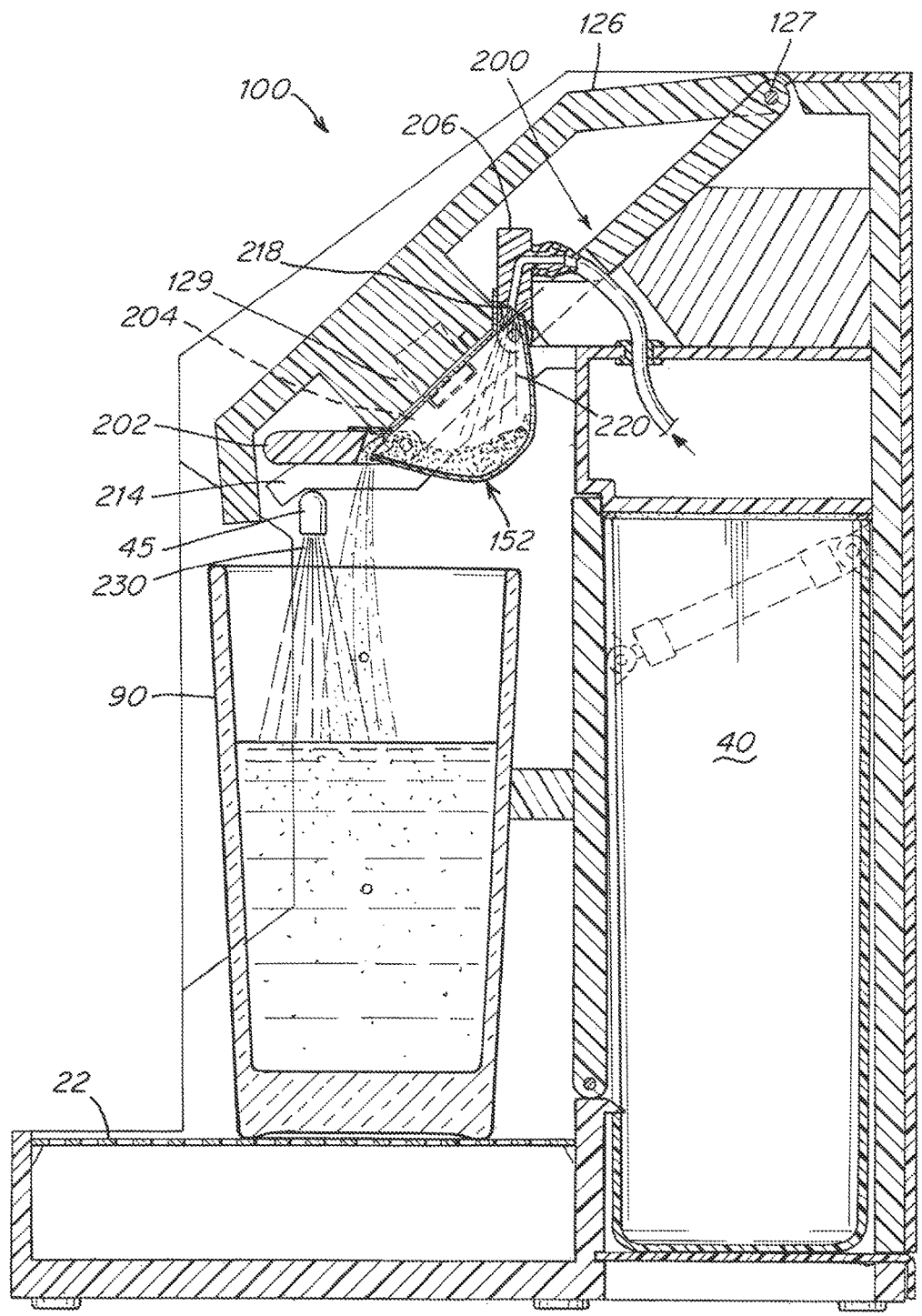
FIG. 7B details a mixing action possible with the invention, specifically, for example, the embodiment of FIG. 7.

As illustrated in FIG. 7A, in one embodiment of the invention, the mix in the capsule is allowed to exit the capsule prior to the addition of a liquid. In this embodiment, the mixing can occur in a mixing funnel and/or in the beverage container itself. FIG. 7B illustrates alternative mixing possibilities. A nozzle 218 fixed within the rear section 206 provides mixing stream 220 to stream water into the capsule. As illustrated, the mixing stream 220 is fixed within the frame 200. Alternatively, it could be outside the frame and oriented in a way that allows the stream to enter the top of the capsule so that the water can mix with the beverage mix. The amount, force and temperature of the mixing stream can be adjusted according to the particular mix or it can remain fixed in the device. Additionally, a finishing stream 230 from Nozzle 45 can be used to add additional water not needed to mix with the beverage mix. For example, in an 8 oz. serving, 3 ounces of water may be used to mix the beverage and 5 oz. may be included in the finishing mix. This allows the appropriate amount of water to be used with mixing without unduly delaying the time needed to complete the mixing and beverage dispensing process. Additionally, since the finishing stream may be different than the mixing stream, the temperature of the mixing stream water may be heated to ensure that the beverage mix is completely dissolved. Chilled water can be used as the finishing stream to ensure that the overall temperature of the beverage is at a desired, cool, temperature. Another benefit of the use of an optional finishing stream is that it can assist in creating a laminar flow of beverage out of the machine so that a user of the beverage dispenser gets a more pleasing view of laminar flow out of the dispenser and not a turbulent flow of mixed beverage. Such a finishing stream can assist in the process of ensuring that use of the device is a pleasant and soothing experience so that one can enjoy the process of preparing a beverage.

As described above, with either embodiment, there are several alternatives which can be employed in the mixing process. All the liquid to create the beverage may be introduced by the mixing stream. This would ensure the entire beverage is mixed and minimize the need for an alternative mixing arrangement. Without a finishing stream, the dispenser would be simplified. With the advantages of a finishing stream, the presently contemplated usage of the beverage dispenser is with both a mixing stream and a finishing stream. The proportion of the amounts of the finishing stream and the mixing stream can vary and even be adjusted by beverage. Another alternative design contemplated is the use of a "finishing stream" with the beverage mix being allowed to exit the capsule by gravity.

The origination and orientation of the finishing stream can also vary. The finishing stream can be oriented to enter the beverage container from an oblique angle and contribute to the mixing process in the beverage container. A pleasant swirling may be created in the glass which can contribute to aesthetically pleasing attributes of the dispenser. The finishing stream may be introduced to the mixing stream under (and along side) the lower opening of the capsule. In this the orientation of the mixing stream is kept in line with the finishing stream and the finishing stream can introduce a laminar flow quality to the beverage mixing stream and contribute to another type of pleasing aspect to the dispensing beverage. Finally, the finishing stream can be oriented so that it joins the mixing stream as the mixing stream exits the capsule. This would allow for the laminar flow to be further introduced to the beverage dispensing stream. If different temperatures are used for the mixing stream and the finishing stream, it would allow the mixing to equalize the temperature to the desired temperature. Since warmer water dissolves the beverage mix more uniformly, it would likely be warm/hot water could be used to mix the beverage and it would be mixed with chilled or cooler water so that the overall temperature of the beverage is at a desired temperature. The use of warmer water in the mixing stream may also allow for less water to be passed through the mixing capsule and speed the delivery of the mixed beverage. Of course, it is possible to use cooler water in the mixing capsule and warmer water in the finishing stream.

Figure 8:
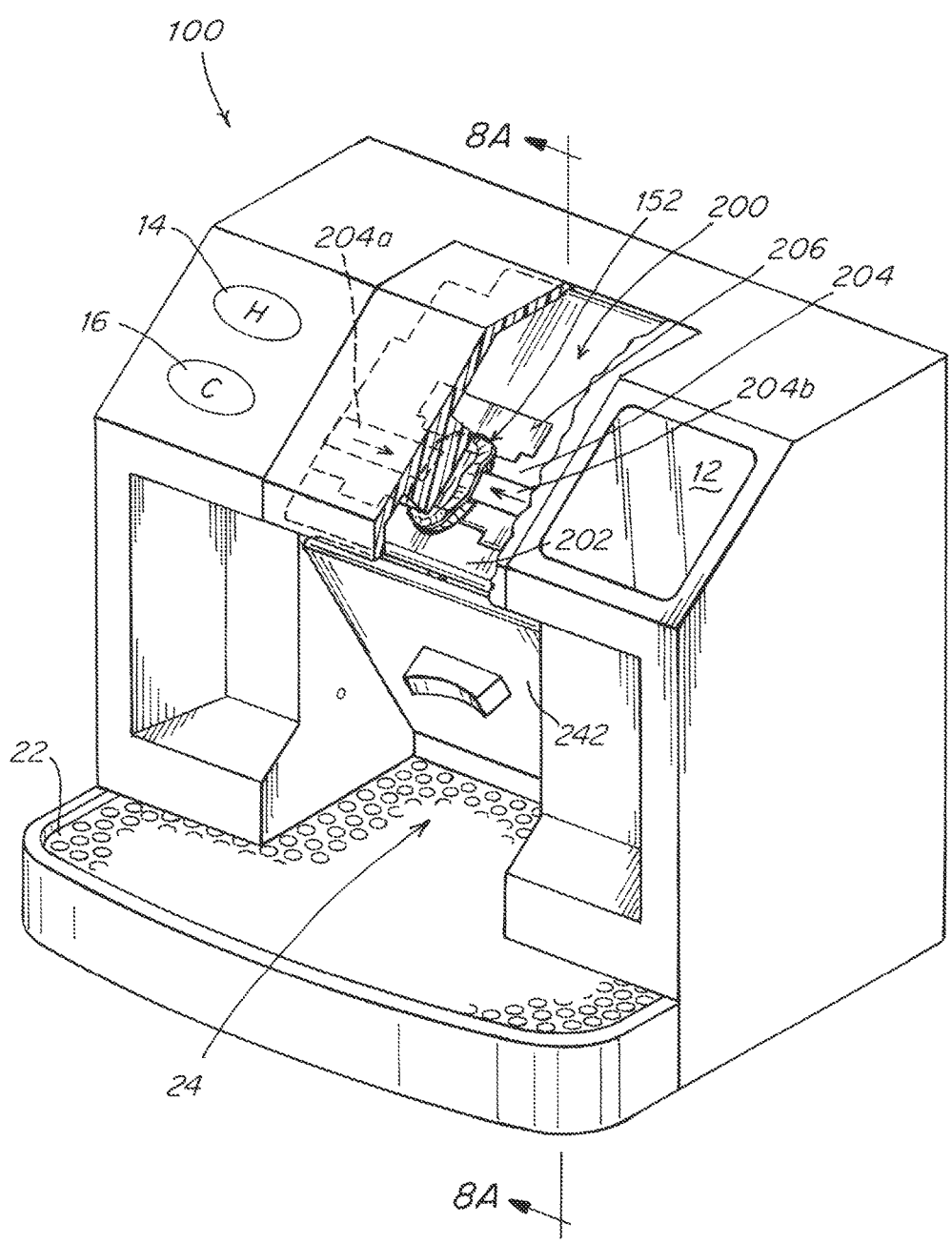
FIG. 8 is an isometric view of another exemplary embodiment of the present invention which illustrates a manner of crushing the capsule.
Figure 8A:
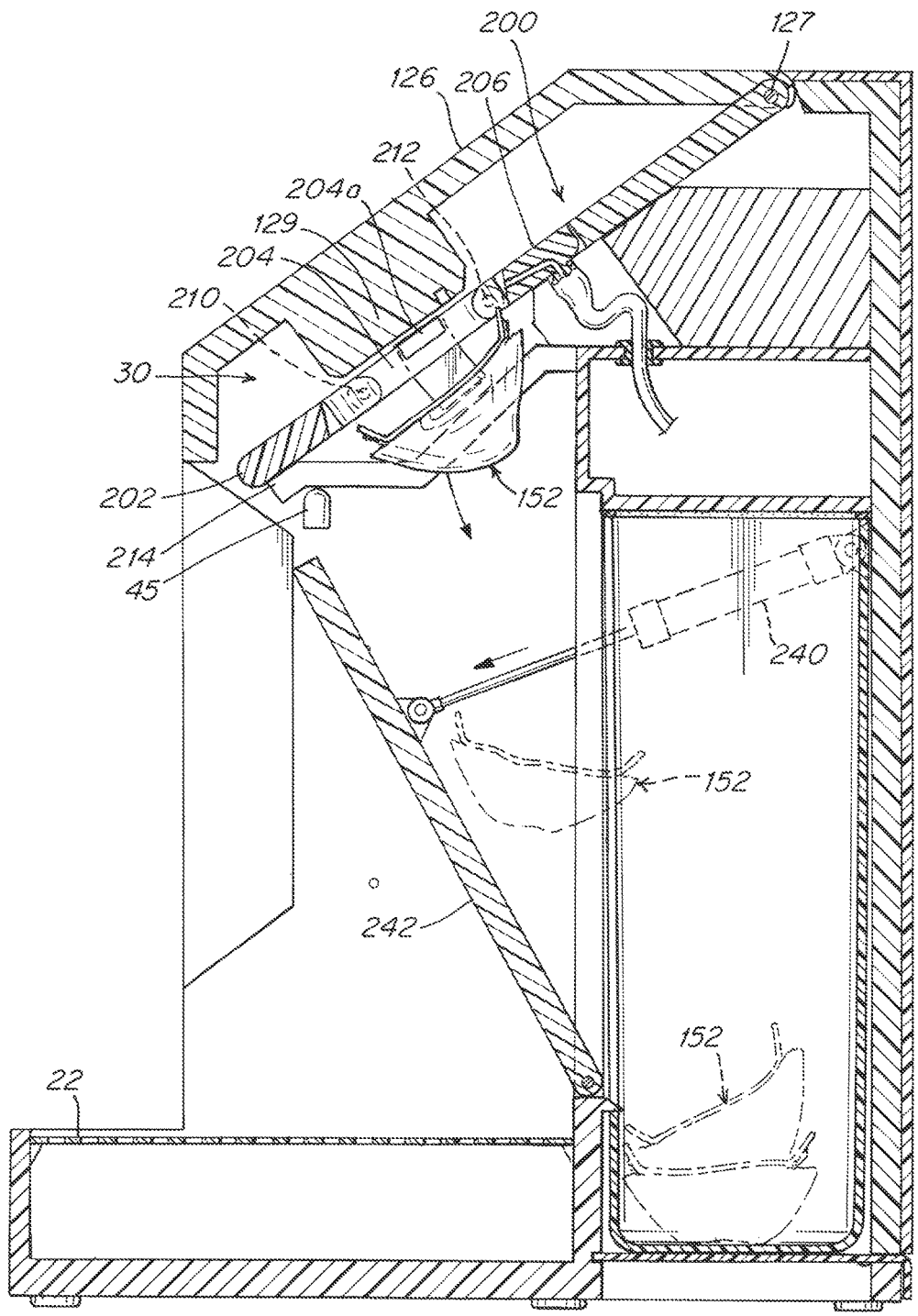
FIG. 8A is a cross section taken along section lines 8A-8A in FIG. 8.

FIG. 8 is an isometric view of another exemplary embodiment of the present invention which illustrates a manner of crushing the capsule and FIG. 8A is a cross section taken along section lines 8A-8A in FIG. 8. In this embodiment the beverage has been dispensed and the capsule must be removed from the frame in order to allow the beverage dispenser to be available to receive another capsule and dispense another beverage. In this embodiment, the central section 204 is contains into two moveable fingers, a left finger 204a and a right finger 204b. The left and right fingers slide laterally toward the capsule so that the capsule is crushed. The left and right arms 204a and 204b pass through slots in the sidewalls of the capsule receiving compartment 30 and are actuated by linear actuators (not shown). The capsule is preferably made from a light, crushable material, such as a thin aluminum sheet. Once the capsule is crushed, the capsule will fall through the opening in the frame.

An optional mechanism 240 to open the empty capsule container to allow for it to fall into the container is illustrated. This mechanism 240, which can be mechanically controlled or controlled by the CPU includes a linear actuator motor which can move a wall 242 so that it is oriented to receive the capsule, as illustrated in FIG. 8A. The CPU can also control the receptacle to be oriented for the process of dispensing another beverage. Of course, springs (not illustrated) can be provided so that the central portions 204a and 204b are returned to the position for accepting another capsule.

Figure 9:
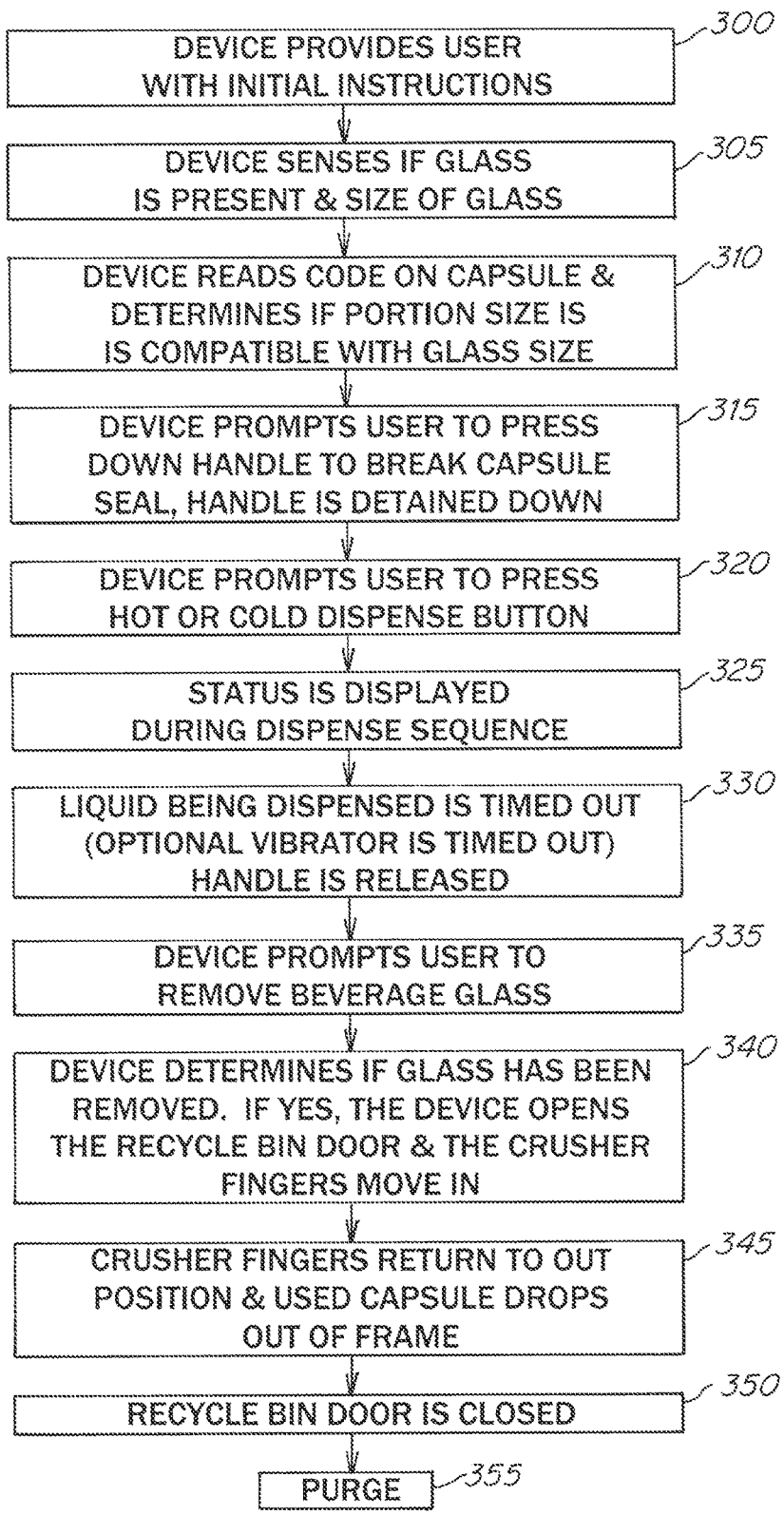
FIG. 9 details a flow chart illustrating an exemplary process for the dispensing a beverage according to the present invention.

FIG. 9 details a flow chart illustrating an exemplary process for the dispensing a beverage according to the present invention. The exemplary process includes a step 300 of dispenser workflow that can be shown on the touchscreen on the housing 10. In step 305, the device senses if a beverage container, such as a glass, is present and what size the container is. The device reads a code on the capsule (or pod) and determines proportion size per container according to step 310. In step 315, the device prompts the user to press down on the handle or otherwise initiate capsule seal breakage. In step 320, the dispenser requests that the user activate the hot or cold water beverage selection. It is also possible that the beverage mixing process could be initiated by the pressing down on the cover to break the capsule. Various automation features could be included to facilitate the initiation of the mixing process and automate the variety of the mixing process.

In step 325 the display screen displays the status of the dispensing beverage. In step 330, the liquid being dispensed by the being displayed and timed out. The step 335 the device prompts user that the beverage is dispensed and invites the user to remove the beverage container from the dispenser. When the device senses that the beverage container has been removed, the recycle process is initiated in step 340 and the fingers of central portion 204a and 204b move to crush the capsule. The recycle door also opens in step 340. In step 345, the capsule drops to the recycle bin and then the recycle bin is closed in 350 and the system may be purged in step 355.

Other system functions may be communicated with words or icons in the system. Possible functions that can be performed by the machine and illustrated on the touch screen either to inform the user that a step should be taken or to notify the user of the status of the machine. For example, the touch screen can be used to instruct the user to purge the system. Additionally, an exemplary screen to alert the user that the trash bin is full and requires emptying. The dispenser can alert the user when the cold water tank is empty and requires filling. Of course the machine may have a connection to line to a source of water, such as tap water, in which case the user may be alerted to issues related to water feed or to problems with the connection. A hot and cold water source may be provided. Finally, if filters are used in the device, a screen for instructing the user to change the filter at the appropriate time may be provided. Appropriate timing for the change in filter, e.g., per number of uses, per number of days, etc. can be built into the programming. The screen can be customized if desired to allow for periodic cleaning or replacement of the "pre filter" and "polish filter" at different cycle times. Also various images or icons can be used to inform and entertain the user during the preparation and dispensing cycle. The images and icons can be still or moving.

Figure 10:
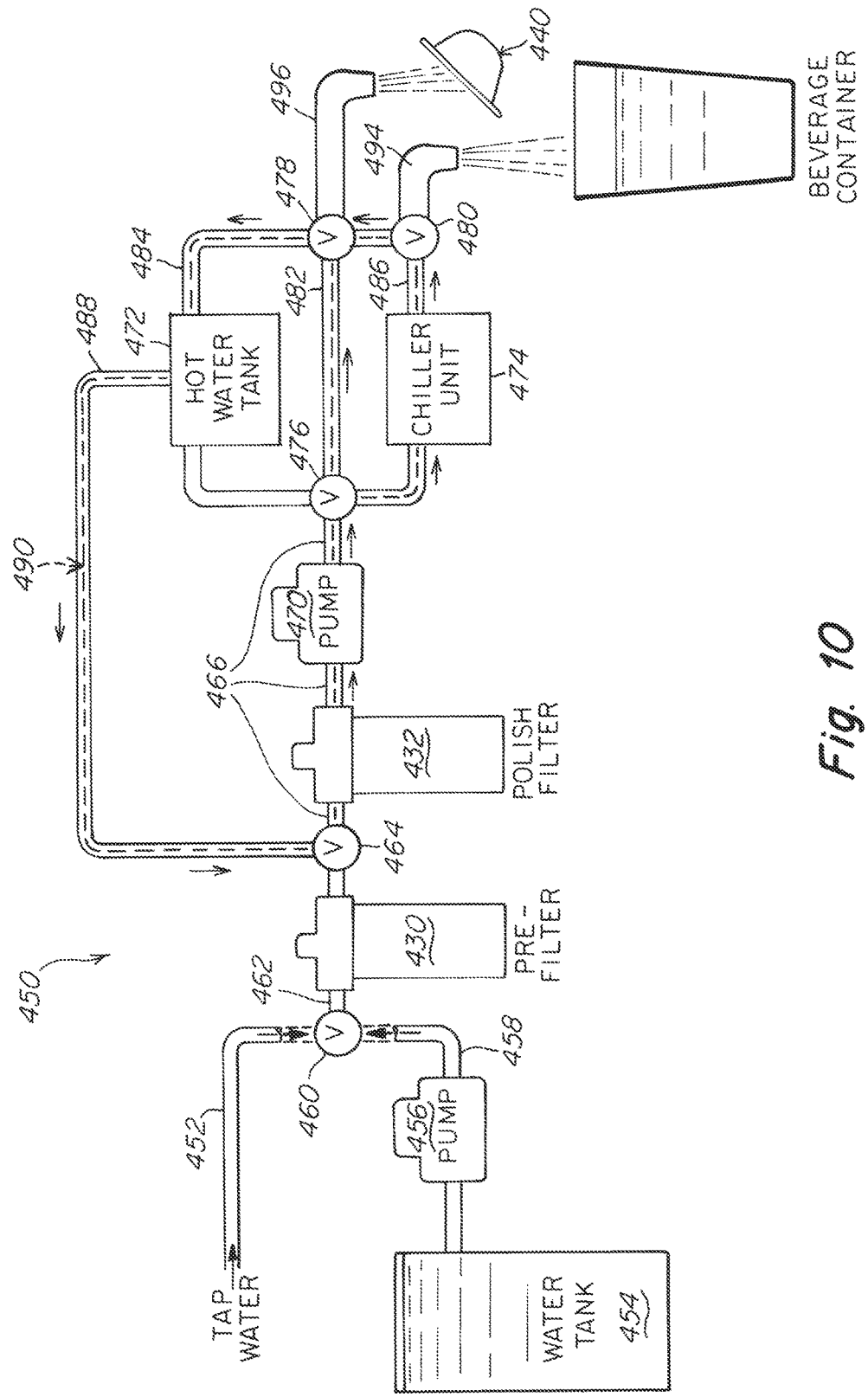
FIG. 10 is an exemplary system schematic which describes the flow paths for fluids in the beverage dispenser.

FIG. 10 is an exemplary system schematic 450 which describes the flow paths for fluids in the beverage dispenser. Water can be supplied by tap water conduit 452 and/or a refillable water tank 454. The refillable tank may have approximately 2-5 liters capacity. The tank should have sufficient capacity to enable several beverages to be prepared serially without extensive delay for chilling or refilling the tank. A pump 456 may be used to move water through a conduit 458 from the water tank 454 toward a system valve 460 which controls the source of the water to be used in the dispensing. The system valve 458 may be used to shut off the water to the dispenser. The pre filter 430 is disposed along conduit line 462. The prefilter may be a commercially available filter suitable for the purpose of purifying the water and removing impurities. A conduit valve 464 is valve that controls the finish water circuit 466 and the purge circuit 490. A dispensing pump 470 is also provided along the conduit 466 to provide fluid to dispense from the dispenser.

In units that provide both heated and chilled beverages, the unit may be configured as illustrated with a hot water tank 472 and a refrigeration/chiller unit 474. Various valves 476, 478 and 480 and conduits 464, 482, 484, 486, 488 connect the components. The dispenser outlets 494, 496 are used to dispense water from the system.

The dispenser according to the present invention may include a "sanitizing loop" which disinfects all post filter non chlorinated conduits so that bacteria in the conduits and components is addressed in an effective manner. Conduits, for example, can be cleaned by opening valves 480, 478 and 476 to allow for the conduits to cycle the hot water. Other types of cleaning/disinfecting designs can be used, for example the conduits can have an inner and an outer fluid conduits which allow for cleansing fluid to be circulated around.

Figure 11A:
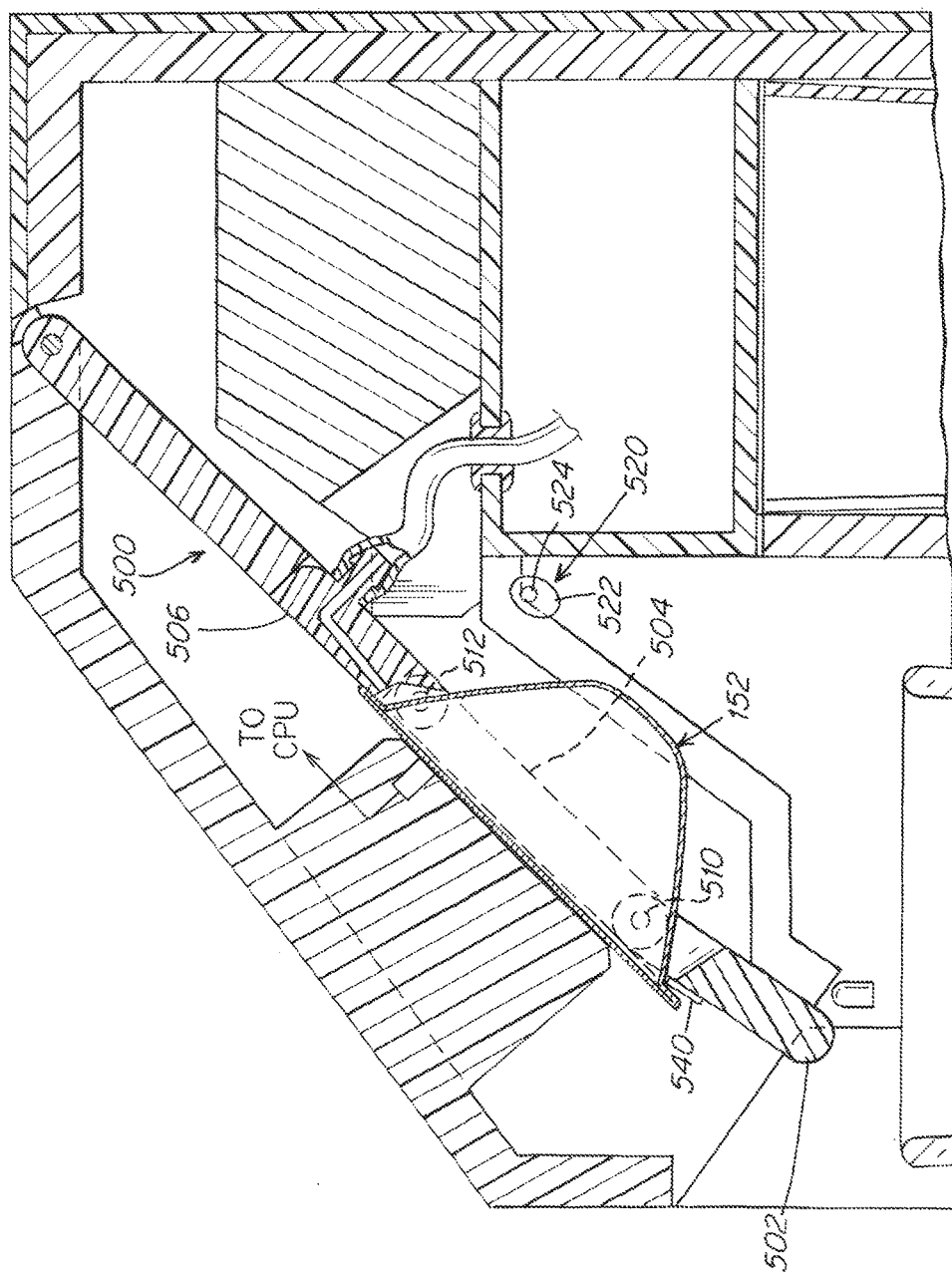
FIGS. 11A and 11B illustrate another embodiment of the present invention where vibration is used in the beverage mixing and/or dispensing process.
Figure 11B:
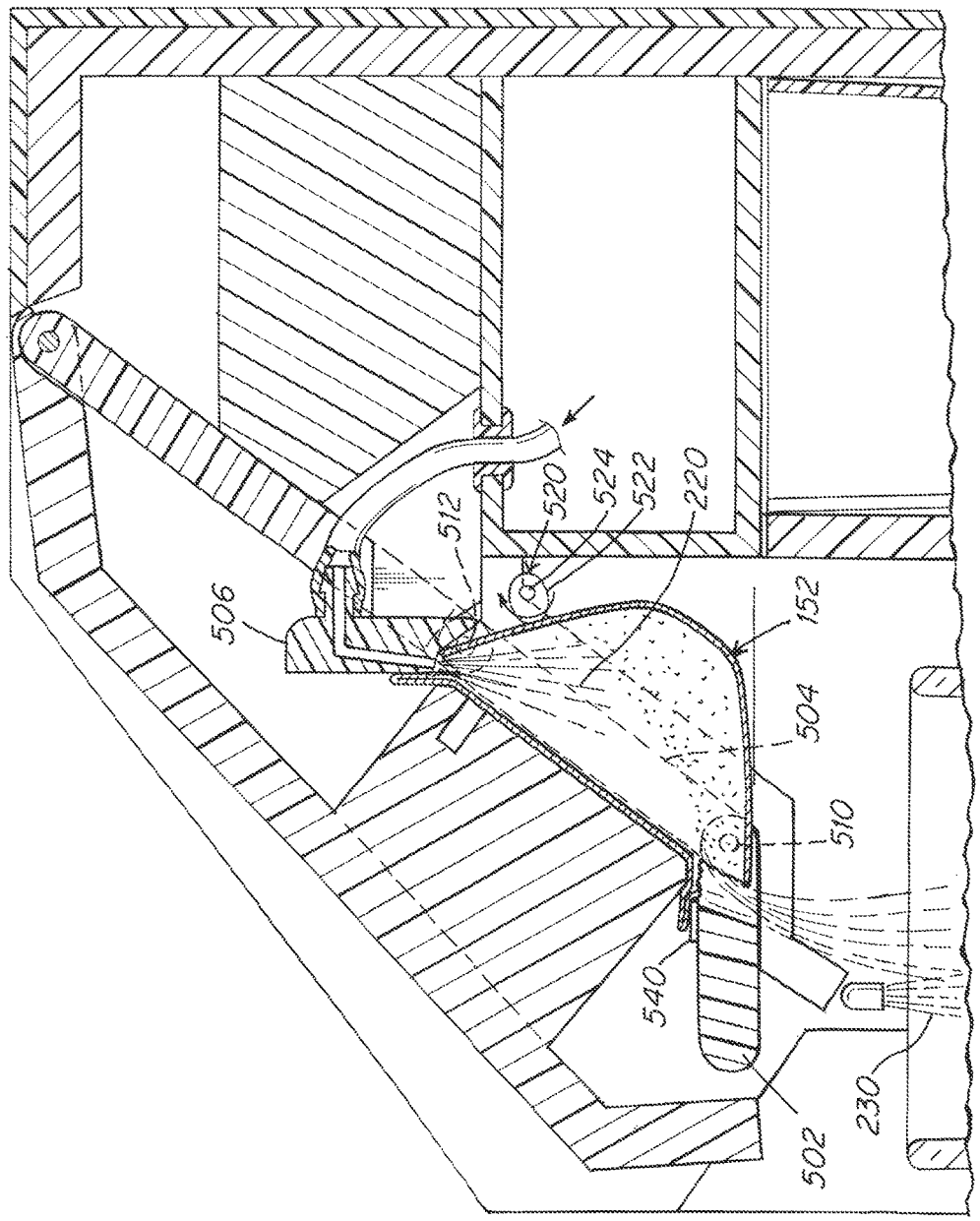

FIGS. 11A and 11B illustrate another embodiment of the present invention where vibration is used in the beverage mixing and/or dispensing process. In this embodiment, the capsule 150 is disposed in the center portion 504 of frame 500 and the frame front section 502 and the frame rear section 506 is hinged (at 510 and 512) as described in the earlier embodiment. Here, the orientation of the capsule 152 is disposed adjacent a vibration mechanism 520 which is an eccentric weighted arm 522 connected by a shaft 524 to a rotary motor (not shown). As the rotary motor rotates the eccentric weight, the vibration created in the capsule 152 mixes the beverage mix in the capsule. The location of the vibration device can be anywhere along the concave portion of the capsule. This can serve to facilitate and make easier the beverage mixing process. Additionally, the vibration may serve to facilitate the movement of the beverage mix out of the capsule and into a mixing area. In a preferred form, illustrated in FIG. 11B, the vibration is engaged when the mixing occurs to ensure that the mix is fully wetted and dissolved into the mixing water.

Vibration can be used with a mixing stream as illustrated. It can also be used with a mixing and a finishing stream. Finally, it is possible that the vibration can be designed such that a sufficient amount of material is vibrated from the capsule and is able to mix in the beverage container or in a mixing funnel.

Also illustrated in FIGS. 11A and 11B is an additional feature of the frame 500 which enables a more consistent opening of the capsule during the opening process. A raised portion 540 on the front of the frame 502 provides a focal place to make an initial crack in the seal of the capsule. Once the initial opening has taken place, the opening will follow the crease along the front and rear ends of the capsule and ensure a smooth and consistent opening process which includes the lowest force required and the most predictable pattern across the front and rear end of the capsule. As illustrated in FIG. 11B, the capsule during mixing is oriented at angle such that the mixing and pouring from the capsule is facilitated. The side of the capsule (the concave section) can be oriented a few degrees off horizontal as indicated in the horizontal line at the bottom of the capsule.

Figure 12A:
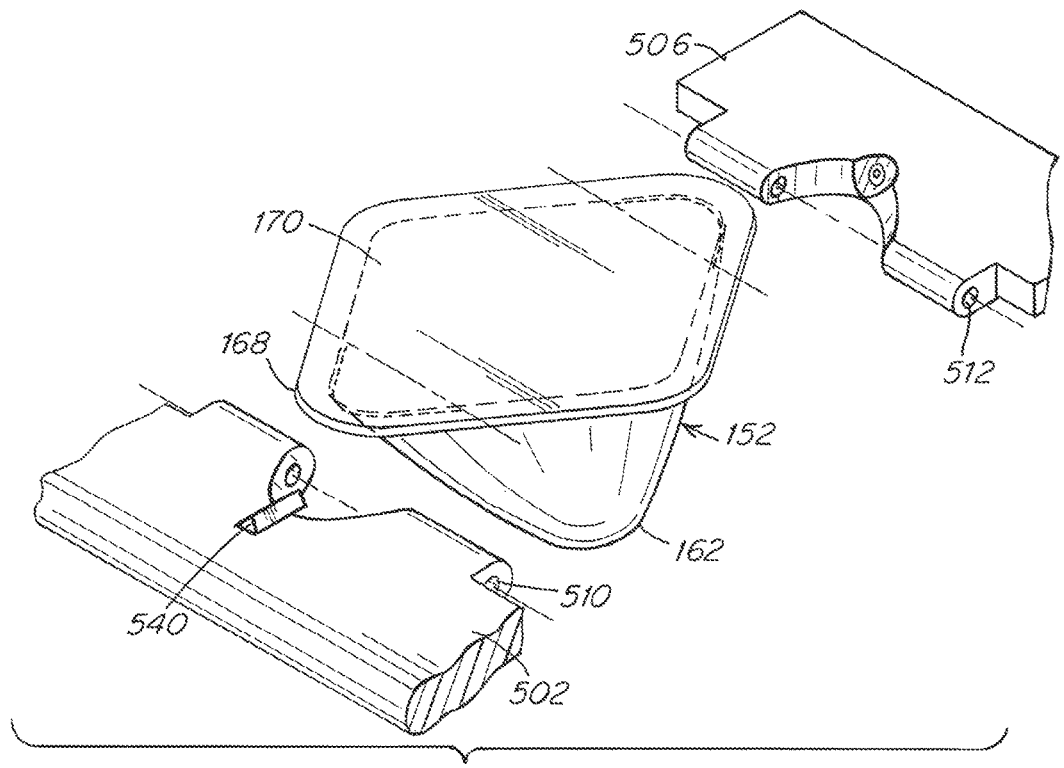
FIGS. 12A, 12B, 13A, 13B illustrate details of the capsule opening process in the embodiment described in connection with FIGS. 5 and 7 of the present invention.
Figure 12B:
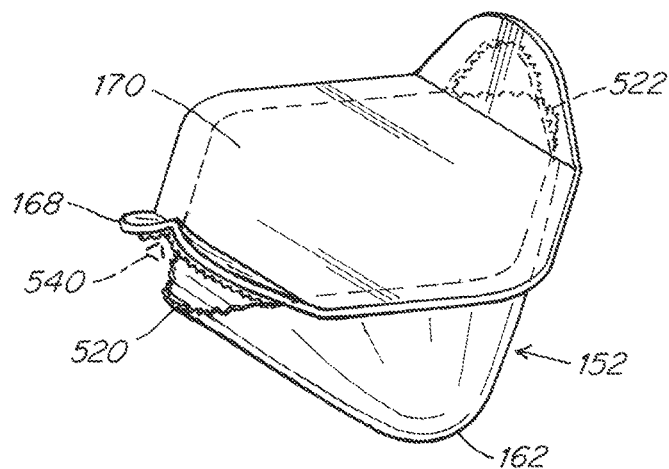
Figure 13A:
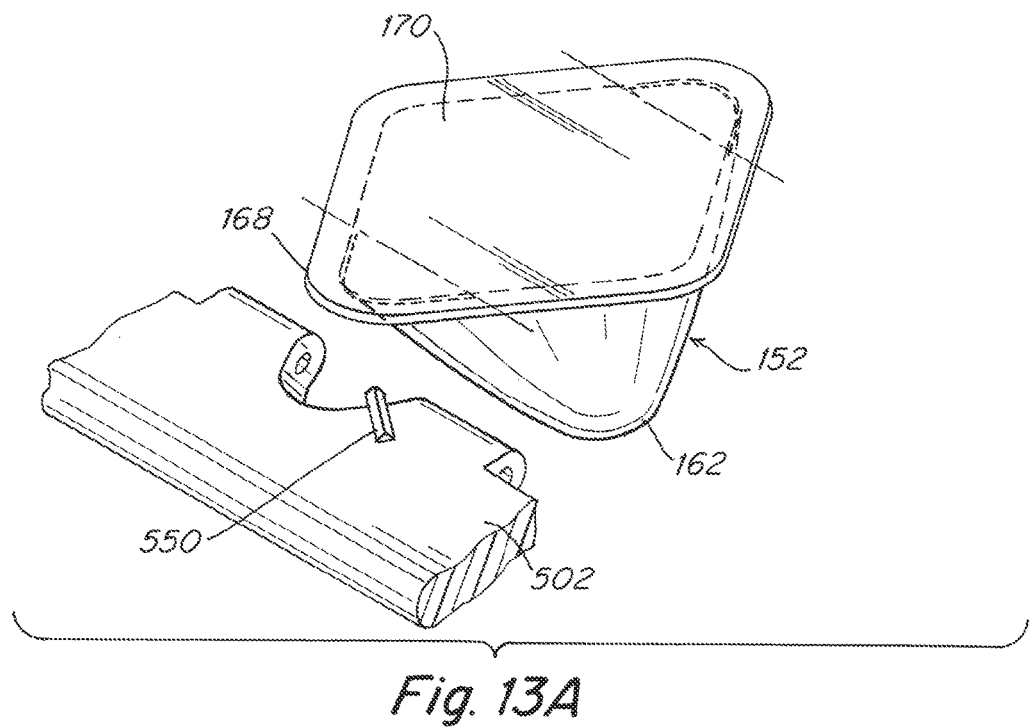
Figure 13B:
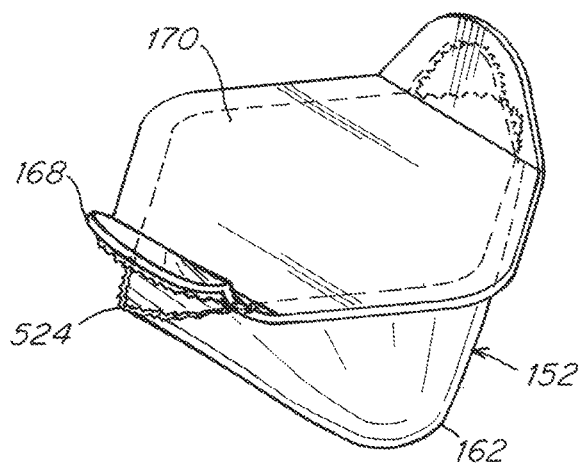

FIGS. 12A, 12B, 13A, 13B illustrate details of the capsule opening process in the embodiment described in connection with FIGS. 5-7 and 11 of the present invention. In particular the front section of the frame includes a raised portion 540 along the symmetric center of the capsule. Of course, the raised portion can be on both the front and the back of the portions on the frame. As illustrated in FIG. 12B, which illustrates a capsule opened using a frame with a raised portion, the opened section 520 is smooth and consistent along the crease of the capsule. Opening 522 which is created without a raised portion 540 is illustrated for comparison. FIGS. 13A and 13B illustrate an alternative embodiment of the raised portion 550 on the frame. In this embodiment, it is disposed a distance away from the centerline of the capsule. This will facilitate the opening of the capsule along the crease across the front (or rear) of the capsule. As illustrated in FIG. 13B, the capsule is opened at 524 with the raised portion 550 off the centerline.

FIGS. 14A-14F illustrate details of the capsule opening process for the embodiment disclosed in FIGS. 5, 7 and 11 in which a crease is illustrated in the capsule. In the illustrated capsule 600 in FIG. 14A, the capsule includes a bottom portion 602 and a lip 604. The edge of the foil cover 606 overhangs the lip slightly. The capsule 600 is constructed with a crease 610, 612 in the front and rear, respectively, along the underside of the lip 604. The crease serves to create a predetermined path for the capsule to open. As illustrated in FIG. 14B. FIGS. 14C and 14D illustrate a particular location of a crease or weakened section 610. The tear line is immediately below the lip 604 and produces an opening as illustrated in FIG. 14D. The opening may have a smoother edge depending on the type of material the capsule is constructed from, and the type of groove or weakened section is in the capsule. FIGS. 14E and 14F illustrate an alternative location for a crease 620. The crease or breaking edge is in the lip 604 so that the breaking and opening mechanism is able to smoothly peel the lid off the edge of the capsule as illustrated in the open capsule in FIG. 14F. In this configuration, the opening can be either between the foil and the lip (e.g., by separating at the glue or the point of affixation between the lip and the foil) or it can be below the top surface of the lip and a portion of the lip can be cracked back with the foil.

Figure 15:
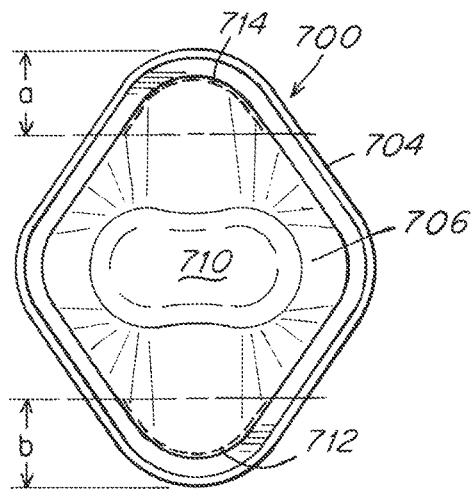
FIGS. 15-17 illustrate top side and end views, respectively, of a capsule of the present invention.
Figure 16:
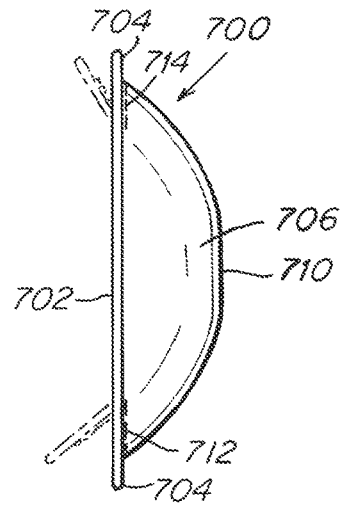
Figure 17:
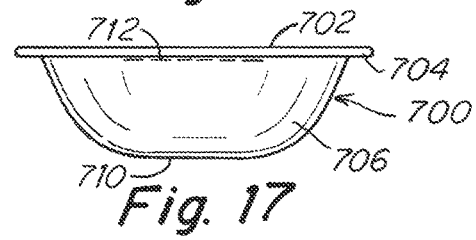

FIGS. 15-17 illustrate top side and end views, respectively, of a capsule 700 of the present invention which may be used with the second embodiment of the invention. The capsule 700 includes a foil cover 702, a lip or curled portion 704 and a concave body portion 706. The concave body portion which is intended to hold the mix material. The bottom of the concave body portion may include a flattened section 710. The flattened section can assist in stabilizing the capsule on a table and stacking the capsules in a column. The sides of the concave body can be shaped in a manner that enables proper pressing of the material to create the concave material. The lip portion 704 can be formed during the same process of the body portion. Alternatively, the lip portion can be added after the body forming process in a secondary assembly process which could streamline the formation of the body portion. The foil cover seals the beverage mix in the capsule. Glue or some other material may be used to create the seal. The seal may be flat as illustrate, or alternatively, it could have a different contour or orientation with respect to the edge of the capsule. A crease or weakened section 712, 714 may be provided to the lip or to body adjacent the lip. The weakened section may be perforated or a thinned section of material. The edge of the weakened section may extend a certain portion around the capsule as illustrated, it could be along a portion of the capsule, up to about one fourth of the longitudinal direction of the capsule as illustrated in FIG. 15 reference distance a and b. Different dimensions may be provided for a and b as needed for opening characteristics. The capsule can be dimension so that only a particular capsule may be used in the machine, and the capsule may have an irregular orientation so that only a capsule in a particular orientation may be used in the cartridge.

Figure 18:
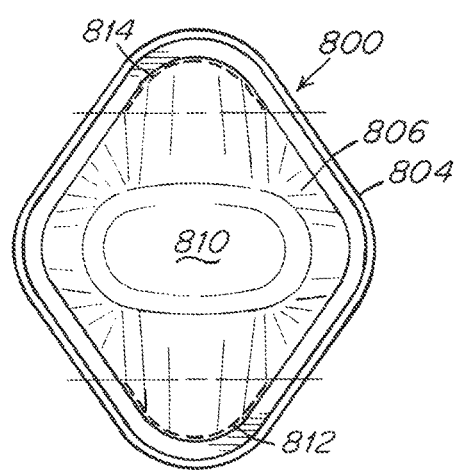
FIGS. 18-20 illustrate top side and end views, respectively, of another, larger capsule of the present invention;
These illustrations are illustrative of the present invention and should not be interpreted to limit the scope or range of the invention presented in this application.
Figure 19:
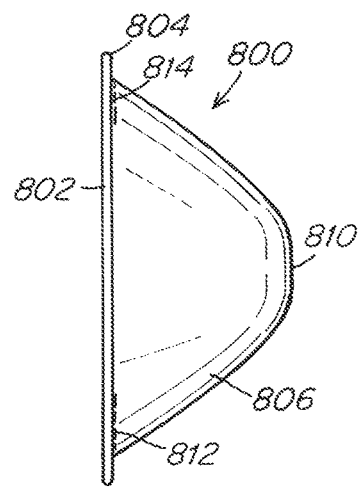
Figure 20:
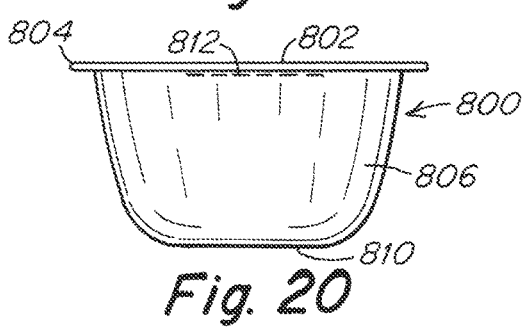

FIGS. 18-20 illustrate top side and end views, respectively, of another, larger capsule 800 of the present invention which may be used with the second embodiment of the invention. The capsule 800 includes a foil cover 802, a lip or curled portion 804 and a concave body portion 806. The concave body portion which is intended to hold the mix material. The bottom of the concave body portion may include a flattened section 810. The flattened section can assist in stabilizing the capsule on a table and stacking the capsules in a column. The sides of the concave body can be shaped in a manner that enables proper pressing of the material to create the concave material. The lip portion 804 can be formed during the same process of the body portion. Alternatively, the lip portion can be added after the body forming process in a secondary assembly process which could streamline the formation of the body portion. The foil cover seals the beverage mix in the capsule. Glue or some other material may be used to create the seal.

The seal may be flat as illustrated, or alternatively, it could have a different contour or orientation with respect to the edge of the capsule. A crease or weakened section 812, 814 may be provided to the lip or to body adjacent the lip. The weakened section may be perforated or a thinned section of material. The edge of the weakened section may extend a certain portion around the capsule as illustrated, it could be along a portion of the capsule, up to about one fourth of the longitudinal direction of the capsule as illustrated in FIG. 18 reference distance c and d. Different dimensions may be provided for c and d as needed for opening characteristics. The capsule can be dimension so that only a particular capsule may be used in the machine, and the capsule may have an irregular orientation so that only a capsule in a particular orientation may be used in the cartridge.

Additional Details of Invention

Using a peeling mechanism to open a capsule is unique and desirable way to open the capsule. Peeling the capsule expands the amount of room inside the capsule allowing an agglomerated powder to have more room to mix with the filtered water. The edge snap method can be used with any of the embodiments of the present invention. In a capsule mixing method the capsule mixing allows the mixed solution to quickly leave the capsule allowing new water to constantly mix with a new layer of dry powder such that the powder does not become wet and form clots. Agglomerated powder does not mix readily when packed tightly. The capsule can be filled with powder or liquid. Optionally to use a powder or a liquid in the capsule. In either case, vibration may be used to mix the material in the capsule with water.

Another advantage of the present invention is the exterior of the capsule does not come into contact with the drink. There is no contact of finished product with the outside of the capsule, as there is no puncture of foil lid or capsule base into the beverage. Most machines have contact of the outside of the capsule and the finished beverage, which is not hygienic. The outside of the capsule has been handled in a non-sterile fashion. Automated Capsule Ejection prevents the used capsule from sitting and breeding bacteria inside the mixing chamber. Having an empty chamber allows for sterilization of said chamber.

Color Screen: offers customers branded beverage experience

The capsules are very eco-friendly and easily recyclable.

High quality premium look and feel of capsules and machine

While there are many puncture mechanisms which prepare and deliver beverages, the La Vit peeling mechanism is believed to be a new way to prepare and deliver drinks By exposing the inside of the capsule to a water jet, the mechanism avoids any build up or clumping of the powder on any part of the capsule as the mixture flushes easily out of the capsule allowing a complete and uniform mixing of the substance. Future development could include introducing a different way to peel or open the capsule, a different capsule shape, and a different way to mix the agents and water. When mixing occurs in the capsule and when empty, it is not prone to mildew or bacterial growth as other capsule based system where the capsule is not flushed.

Commercial applications of the product include the office and home primarily but include hospitals, institutions, schools, hotels, cruise boats and any environment where a point-of-use drink machine would be convenient and beneficial.

The invention claimed is:

1. A beverage dispenser comprising:
   a housing with a housing lid covering a capsule insertion port; a frame mounted in the housing adapted to receive a beverage capsule through the capsule insertion port,
   the beverage capsule having a capsule body, rim and capsule lid and containing a beverage mix, the frame configured to engage the rim of the capsule;
   a hinge attached to the frame configured to rotate the capsule body downward when the housing lid is closed causing the capsule body to crack and open along a crease located immediately below the rim;
   a mixing stream nozzle positioned to inject a predetermined amount of mixing liquid into the capsule after the capsule is open;
   the mixing stream nozzle positioned to then inject an additional amount of mixing liquid sufficient to force the beverage mix out of the capsule and into a beverage exit orifice;
   a finishing stream nozzle positioned to inject a predetermined amount of finishing liquid into the beverage exit orifice as the beverage mix exits the capsule.

2. The beverage dispenser of claim 1 wherein the mixing liquid is water.

3. The beverage dispenser of claim 1 wherein the finishing liquid is water.

4. The beverage dispenser of claim 1 wherein the mixing liquid is warmer than the finishing liquid.

5. The beverage dispenser of claim 1 wherein the mixing liquid is water of ambient temperature, and the finishing liquid is chilled water.

6. The beverage dispenser of claim 1 further comprising a code reader positioned to read a code on the capsule body or capsule lid.

7. The beverage dispenser of claim 6 wherein the code is a bar code.

8. The beverage dispenser of claim 6 wherein the code is a 2-dimensional code.

9. The beverage dispenser of claim 1 further comprising a mechanism in the housing adapted to dispose of the capsule after use.

10. The beverage dispenser of claim 9 wherein the mechanism crushed the capsule for disposal.

11. The beverage dispenser of claim 1 wherein the hinge rotates the capsule a maximum of 45 degrees from horizontal.

12. The beverage dispenser of claim 1 further comprising a touch screen configured to provide information to a user and receive instructions from a user.

* * * * *